(12) United States Patent
Hindy et al.

(10) Patent No.: US 12,494,882 B2
(45) Date of Patent: Dec. 9, 2025

(54) CSI REPORTING WITH PARAMETER COMBINATION SELECTION

(71) Applicant: Lenovo (Singapore) Pte. Ltd., New Tech Park (SG)

(72) Inventors: Ahmed Monier Ibrahim Saleh Hindy, Aurora, IL (US); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 323 days.

(21) Appl. No.: 18/249,369

(22) PCT Filed: Oct. 15, 2021

(86) PCT No.: PCT/IB2021/059530
§ 371 (c)(1),
(2) Date: Apr. 17, 2023

(87) PCT Pub. No.: WO2022/079691
PCT Pub. Date: Apr. 21, 2022

(65) Prior Publication Data
US 2023/0388080 A1    Nov. 30, 2023

Related U.S. Application Data

(60) Provisional application No. 63/092,445, filed on Oct. 15, 2020.

(51) Int. Cl.
*H04L 5/00* (2006.01)
(52) U.S. Cl.
CPC .......... *H04L 5/0051* (2013.01); *H04L 5/0094* (2013.01)

(58) Field of Classification Search
CPC .......... H04B 7/04; H04B 7/06; H04B 7/0613; H04B 7/0615; H04B 7/0619;
(Continued)

(56) References Cited

U.S. PATENT DOCUMENTS

2019/0260430 A1    8/2019  Cai et al.
2020/0127721 A1*   4/2020  Li ............................. H04L 1/06
(Continued)

OTHER PUBLICATIONS

PCT/IB2021/059530, "Notification of Transmittal of the International Search Report and the Written Opinion of the International Searching Authority, or the Declaration", International Searching Authority, Feb. 2, 2022, pp. 1-16.
(Continued)

*Primary Examiner* — Paul H. Masur
(74) *Attorney, Agent, or Firm* — Kunzler Bean & Adamson

(57) ABSTRACT

Apparatuses, methods, and systems are disclosed for reporting a UE-selected parameter combination for reciprocity-based Type-II CSI codebook. One apparatus includes a processor and a transceiver that receives a CSI reporting configuration from a mobile communication network, the reporting configuration containing a codebook configuration. The processor identifies a set of antenna ports based on a received set of CSI reference signals and generates at least one coefficient amplitude indicator and one coefficient phase indicator for each antenna port in the identified set of antenna ports. The processor selects a subset of at least one parameter combination from a set of two or more parameter combinations corresponding to the codebook configuration
(Continued)

and sends a CSI report to the mobile communication network, the CSI report indicating the selected parameter combination.

15 Claims, 11 Drawing Sheets

(58) Field of Classification Search
CPC .. H04B 7/0636; H04B 7/0645; H04B 7/0413; H04B 7/0456; H04B 7/0482; H04L 5/005; H04L 5/0048; H04L 5/0051; H04L 5/0053; H04L 5/0057; H04L 5/0091; H04L 5/0094
See application file for complete search history.

(56) References Cited

U.S. PATENT DOCUMENTS

| | | | | |
|---|---|---|---|---|
| 2020/0162142 | A1 | 5/2020 | Rahman et al. | |
| 2023/0040085 | A1* | 2/2023 | Li | H04B 7/0626 |
| 2023/0098904 | A1* | 3/2023 | Hindy | H04B 7/0617 370/329 |
| 2023/0170963 | A1* | 6/2023 | Wu | H04B 7/0626 370/329 |
| 2023/0246781 | A1* | 8/2023 | Kim | H04L 5/005 370/329 |
| 2023/0403059 | A1* | 12/2023 | Mueller | H04L 5/0053 |
| 2024/0275451 | A1* | 8/2024 | Faxér | H04B 7/0478 |

OTHER PUBLICATIONS

ZTE, "Type II CSI feedback based on linear combination", 3GPP TSG RAN WG1 Meeting #88bis R1-1707127, May 15-19, 2017, pp. 1-14.

Huawei et al., "The remaining issues for Type II codebook", 3GPP TSG RAN WG1 Meeting #89 R1-1708140, May 15-19, 2017, pp. 1-10.

Samsung et al., "WF on Type I and II CSI codebooks", 3GPP TSG-RAN WG1 #89 R1-1709232, May 15-19, 2017, pp. 1-24.

Lenovo et al., "CSI enhancements for mTRP and FDD reciprocity", 3GPP TSG RAN WG1 #102e R1-2005926, Aug. 17-28, 2020, pp. 1-8.

Ericsson, "Introduction of NR MIMO", 3GPP TSG-RAN2 Meeting #108 R2-1914716, Nov. 18-22, 2019, pp. 1-25.

3GPP, "3rd Generation Partnership Project; Technical Specification Group Radio Access Network; NR; Physical layer procedures for control (Release 16)", 3GPP TS 38.213 V16.2.0, Jun. 2020, pp. 1-176.

3GPP, "3rd Generation Partnership Project; Technical Specification Group Radio Access Network; NR; Physical layer procedures for data (Release 16)", 3GPP TS 38.214 V16.1.0, Mar. 2020, pp. 1-151.

3GPP, "3rd Generation Partnership Project; Technical Specification Group Radio Access Network; NR; Radio Resource Control (RRC) protocol specification (Release 16)", 3GPP TS 38.331 V16.1.0, Jul. 2020, pp. 1-906.

* cited by examiner

```
-- ASN1START
-- TAG-CODEBOOKCONFIG-START

CodebookConfig ::=            SEQUENCE {
   codebookType                  CHOICE {
                                    [..................]
   }
}

CodebookConfig-r16 ::=        SEQUENCE {
   codebookType                  CHOICE {
                                    [..................]
   }
}

CodebookConfig-r17 ::=        SEQUENCE {
   codebookType                     CHOICE {                            ~ 305
      Type2                            SEQUENCE {
         subType                         CHOICE {
            typeII-PortSelection-r17        SEQUENCE {
                                               [..................]
         },
         numberOfPMI-SubbandsPerCQI-Subband-r17 INTEGER (1..4),
         paramCombination-r17                   INTEGER (1..8)
      }
   }
}

-- TAG-CODEBOOKCONFIG-STOP
-- ASN1STOP
```

```
-- ASN1START
-- TAG-CSI-REPORTCONFIG-START

CSI-ReportConfig ::=           SEQUENCE {
    reportConfigId                 CSI-ReportConfigId,
    carrier                        ServCellIndex                                            OPTIONAL,     -- Need S
    resourcesForChannelMeasurement CSI-ResourceConfigId,
    csi-IM-ResourcesForInterference CSI-ResourceConfigId                                    OPTIONAL,     -- Need R
    nzp-CSI-RS-ResourcesForInterference CSI-ResourceConfigId                                OPTIONAL,     -- Need R reportConfigType     CHOICE {
        periodic             SEQUENCE {
            reportSlotConfig     CSI-ReportPeriodicityAndOffset,
            pucch-CSI-ResourceList SEQUENCE (SIZE (1..maxNrofBWPs)) OF PUCCH-CSI-Resource
        },
        semiPersistentOnPUCCH SEQUENCE {
            reportSlotConfig     CSI-ReportPeriodicityAndOffset,
            pucch-CSI-ResourceList SEQUENCE (SIZE (1..maxNrofBWPs)) OF PUCCH-CSI-Resource
        },
        semiPersistentOnPUSCH SEQUENCE {
            reportSlotConfig     ENUMERATED {sl5, sl10, sl20, sl40, sl80, sl160, sl320},
            reportSlotOffsetList SEQUENCE (SIZE (1..maxNrofUL-Allocations)) OF
                                    INTEGER(0..32),
            p0alpha              P0-PUSCH-AlphaSetId
        },
        aperiodic             SEQUENCE {
            reportSlotOffsetList SEQUENCE (SIZE (1..maxNrofUL-Allocations)) OF INTEGER(0..32)            OPTIONAL,   -- Need R
        }
    },
    channelReciprocity              ENUMERATED (TRUE)                                       OPTIONAL,     -- Need R
    [......]
}

-- TAG-CSI-REPORTCONFIG-STOP
-- ASN1STOP
```

FIG. 4

```
-- ASN1START
-- TAG-CODEBOOKCONFIG-START

CodebookConfig ::=         SEQUENCE {
    codebookType               CHOICE {
        [..........]
    }
}

CodebookConfig-r16 ::=     SEQUENCE {
    codebookType               CHOICE {
        [..........]
    }
}

CodebookConfig-r17 ::=     SEQUENCE {
    codebookType               CHOICE {
        Type2                      SEQUENCE {
            subType                    CHOICE {
                typeII-PortSelection-r17   SEQUENCE {
                    ┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
                    │ channelReciprocity        ENUMERATED (TRUE)    OPTIONAL,   -- Need R ─┤~505
                    └─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                    numberOfPMI-SubbandsPerCQI-Subband-r17    INTEGER (1..4),
                    paramCombination-r17                      INTEGER (1..8)
                }
            }
        }
    }
}

-- TAG-CODEBOOKCONFIG-STOP
-- ASN1STOP
```

FIG. 5

```
-- ASN1START
-- TAG-CODEBOOKCONFIG-START

CodebookConfig ::=         SEQUENCE {
    codebookType               CHOICE {
        [..................]
    }
}

CodebookConfig-r16 ::=     SEQUENCE {
    codebookType               CHOICE {
        [..................]
    }
}

CodebookConfig-r17 ::=     SEQUENCE {
    codebookType               CHOICE {
        type2                      SEQUENCE {
            subType                    CHOICE {
                typeII-PortSelection-r17   SEQUENCE {
                    channelReciprocity         ENUMERATED (TRUE)    OPTIONAL, -- Need R
                    numberOfPMI-SubbandsPerCQI-Subband-r17   INTEGER (1..4),    OPTIONAL, -- Need R
                    paramCombination-r17                     INTEGER (1..8),
                    numberOfPMI-SubbandsPerCQI-Subband1-r17  INTEGER (1..4),    OPTIONAL, -- Need R
                    paramCombination1-r17                    INTEGER (1..8)
                }
            }
        }
    }
}

-- TAG-CODEBOOKCONFIG-STOP
-- ASN1STOP
```

FIG. 6

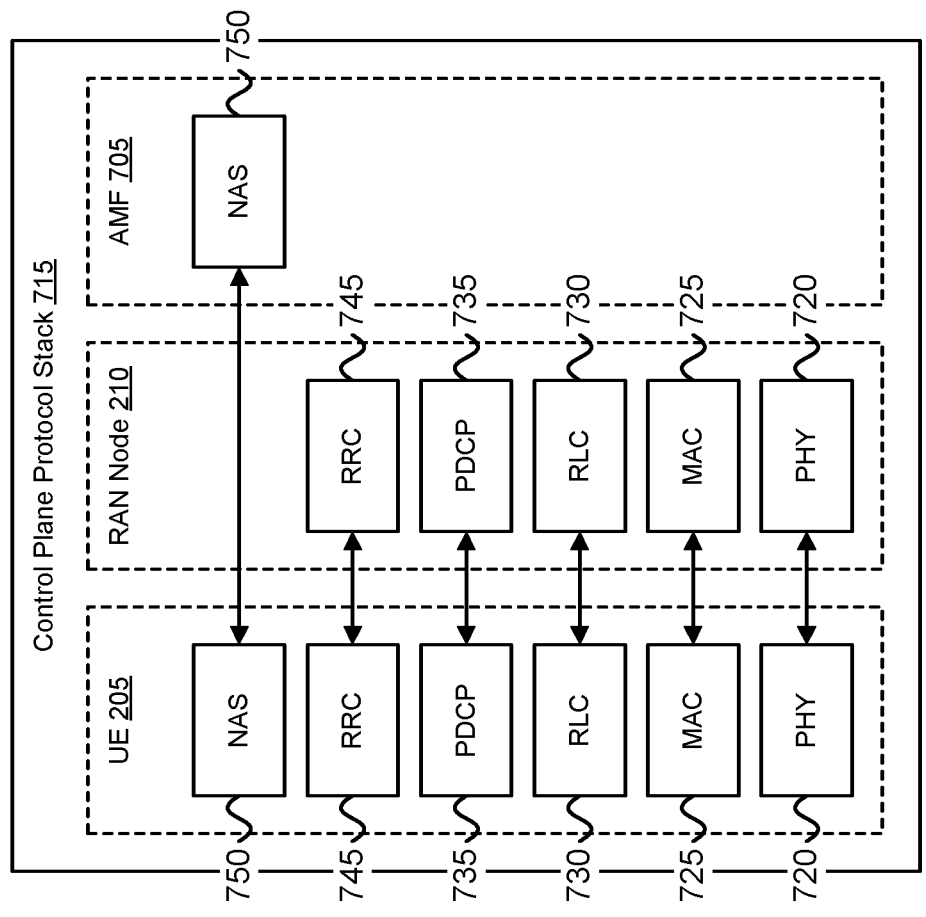
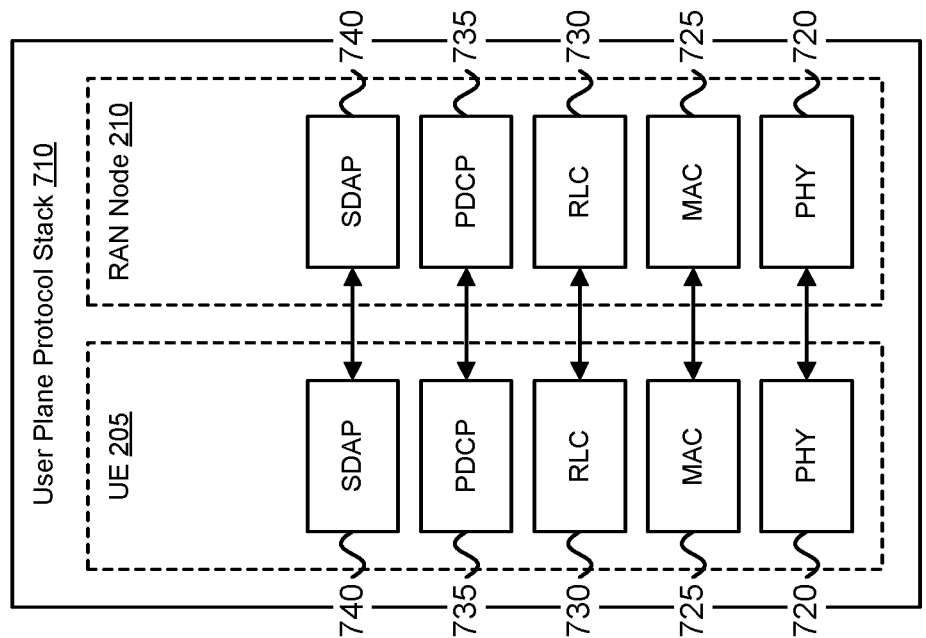
FIG. 7

CSI REPORTING WITH PARAMETER COMBINATION SELECTION

CROSS-REFERENCE TO RELATED APPLICATIONS

This application claims priority to U.S. Provisional Patent Application No. 63/092,445 entitled "RECIPROCITY-BASED TYPE-II CODEBOOK WITH UE-ASSISTED PARAMETER COMBINATION SELECTION" and filed on Oct. 15, 2020 for Ahmed Hindy and Vijay Nangia, which application is incorporated herein by reference.

FIELD

The subject matter disclosed herein relates generally to wireless communications and more particularly relates to configuring a reciprocity-based Type-II CSI codebook and UE-assisted parameter combination selection.

BACKGROUND

For Channel State Information ("CSI") reporting in Third Generation Partnership Project ("3GPP") New Radio ("NR") Release 16 specification ("Rel-16"), two types of codebooks are defined. The NR Type-I codebook uses multiple predefined matrices from which a selection is made by User Equipment ("UE") report and/or Radio Resource Control ("RRC") Configuration. However, the Type-II codebook is not based on a predefined table, but it is based on a specifically designed mathematical formula with a several parameters. The parameters in the formula are determined by RRC Configuration and/or UE report. The NR Type-II codebook is based on a more detailed CSI report and supports Multi-User Multiple-Input, Multiple-Output ("MU-MIMO") communication.

For the NR Rel-16 Type-II codebook, the number of Precoding Matrix Indicator ("PMI") bits fed back from the UE to the next-generation node-B ("gNB") via Uplink Control Information ("UCI") can be very large (>1000 bits at large bandwidth). In addition, the number of Channel State Information Reference Signals ("CSI-RS") ports sent in the downlink channel to enable channel estimation at the user equipment can be large as well, leading to higher system complexity and loss of resources over reference signaling.

BRIEF SUMMARY

Disclosed are procedures for configuring a reciprocity-based Type-II CSI codebook and UE-assisted parameter combination selection. Said procedures may be implemented by apparatus, systems, methods, or computer program products.

One method of a User Equipment ("UE") for reporting a UE-selected parameter combination for reciprocity-based Type-II CSI codebook includes a Channel State Information ("CSI") reporting configuration from a mobile communication network, said reporting configuration containing a codebook configuration. The method includes receiving a set of CSI reference signals and identifying a set of antenna ports based on the set of CSI reference signals. The method includes selecting a subset of at least one parameter combination from a set of two or more parameter combinations corresponding to the codebook configuration and generating at least one coefficient amplitude indicator and one coefficient phase indicator for each antenna port in the identified set of antenna ports. The method includes sending a CSI report to the mobile communication network, the CSI report indicating the selected parameter combination, the CSI report including a rank indicator that indicates the number of transmission layers and the generated at least one amplitude and phase coefficient indicator.

One method of a Radio Access Network ("RAN") for reporting a UE-selected parameter combination for reciprocity-based Type-II CSI codebook includes transmitting a CSI reporting configuration to a UE in a mobile communication network, said CSI reporting configuration containing a codebook configuration. The second method includes transmitting a set of CSI reference signals towards the UE and receiving a CSI report from the UE, said CSI report indicating a selected subset of at least one parameter combination from a set of two or more parameter combinations corresponding to the codebook configuration. Additionally, the CSI report includes a rank indicator that indicates the number of transmission layers and at least one coefficient amplitude indicator and at least one coefficient phase indicator for each antenna port in a set of antenna ports identified by the UE.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3 is a block diagram illustrating one embodiment of ASN.1 code for configuring the UE with a reciprocity-based codebook;

FIG. 4 is a block diagram illustrating a second embodiment of ASN.1 code for configuring the UE with a reciprocity-based codebook;

FIG. 5 is a block diagram illustrating a third embodiment of ASN.1 code for configuring the UE with a reciprocity-based codebook;

FIG. 6 is a block diagram illustrating one embodiment of ASN.1 code for configuring the UE with at least two parameter combinations as part of the codebook configuration;

FIG. 7 is a block diagram illustrating one embodiment of a Fifth-Generation ("5G") New Radio ("NR") protocol stack;

DETAILED DESCRIPTION

Figure 1:
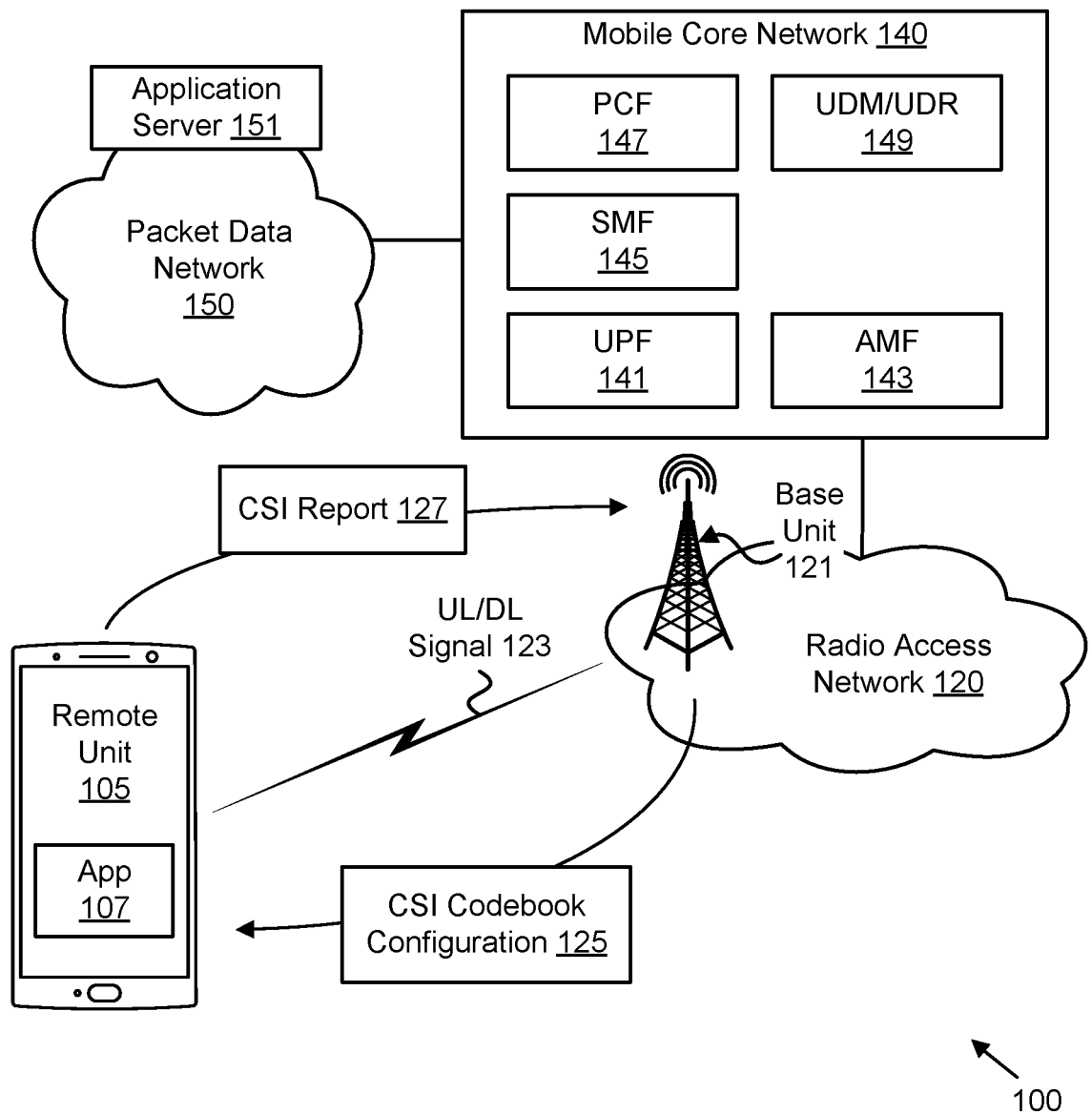
FIG. 1 is a block diagram illustrating one embodiment of a wireless communication system for reporting a UE-selected parameter combination for reciprocity-based Type-II CSI codebook.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The call-flow diagrams, flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the call-flow, flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures Like numbers refer to like elements in all figures, including alternate embodiments of like elements.

Generally, the present disclosure describes systems, methods, and apparatus for reporting a UE-selected parameter combination for reciprocity-based Type-II CSI codebook. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

For 3GPP NR Release 16 ("Rel-16") Type-II codebook the number of Precoding Matrix Indicator ("PMI") bits fed back from the User Equipment ("UE") in the next-generation node-B ("gNB") via Uplink Control Information ("UCI") can be very large (>1000 bits at large bandwidth). In addition, the number of Channel State Information Reference Signals ("CSI-RS") ports sent in the downlink channel to enable channel estimation at the user equipment can be large as well, leading to higher system complexity and loss of resources over reference signaling. Thereby, further reduction of the PMI feedback bits and/or a reduction in the number of CSI-RS ports utilized is needed to improve efficiency.

A special case of the NR Rel-16 Type-II codebook (dubbed port-selection codebook) was proposed, in which the number of CSI-RS ports was reduced via applying an underlying spatial beamforming process. No insight onto how to design this beamforming process was provided. In addition, it has been recently discussed in the literature that the channel correlation between uplink and downlink channels can be exploited to reduce CSI feedback overhead, even in the Frequency-Division Duplexing ("FDD") mode where the Uplink ("UL")-Downlink ("DL") carrier frequency spacing is not too large. Also, two issues are expected to arise under DL channel estimation based on partial UL channel reciprocity under FDD mode. First, the UL channel estimated at the gNB may not be accurate due to conventional channel estimation issues that are well-known in the field of wireless communications, e.g., channel quantization and hardware impairments. Second, the channel may vary within the time between the transmission of the Sounding Reference Signals ("SRS") for UL CSI acquisition and the transmission of the beamformed CSI-RSs.

Disclosed herein are techniques for CSI-RS beamforming and uplink CSI feedback reporting that improve the efficiency of Type-II port-selection codebook. More specifically, a flexible CSI feedback reporting structure is discussed that can be efficient under different levels of UL-DL channel reciprocity strength.

Regarding the 3GPP NR Rel-15 Type-II Codebook, it is assumed that the gNB is equipped with a two-dimensional ("2D") antenna array with $N_1$, $N_2$ antenna ports per polarization placed horizontally and vertically and communication occurs over $N_3$ PMI sub-bands. A PMI subband consists of a set of resource blocks, each resource block consisting of a set of subcarriers. In such case, $2N_1N_2$ CSI-RS ports are utilized to enable DL channel estimation with high resolution for NR Rel-15 Type-II codebook.

In order to reduce the UL feedback overhead, a Discrete Fourier transform ("DFT")-based CSI compression of the spatial domain is applied to L dimensions per polarization, where $L<N_1N_2$. In the sequel the indices of the 2L dimensions are referred as the Spatial Domain ("SD") basis indices. The magnitude and phase values of the linear combination coefficients for each sub-band are fed back to the gNB as part of the CSI report. The $2N/N_2 \times N_3$ codebook per layer takes on the form $$W = W_1 W_2$$

where $W_1$ is a $2N_1N_2 \times 2L$ block-diagonal matrix ($L<N1N2$) with two identical diagonal blocks, i.e., $$W_1 = \begin{bmatrix} B & 0 \\ 0 & B \end{bmatrix},$$

and B is an $N_1N_2 \times L$ matrix with columns drawn from a 2D oversampled DFT matrix, as follows.

$$u_m = \begin{bmatrix} 1 & e^{j\frac{2\pi m}{O_2 N_2}} & \cdots & e^{j\frac{2\pi m(N_2-1)}{O_2 N_2}} \end{bmatrix}$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T$$

$$B = \begin{bmatrix} v_{l_0,m_0} & v_{l_1,m_1} & \cdots & v_{l_{L-1},m_{L-1}} \end{bmatrix}$$

$$l_i = O_1 n_1^{(i)} + q_1,\ 0 \le n_1^{(i)} < N_1,\ 0 \le q_1 < O_1 - 1$$

$$m_i = O_2 n_2^{(i)} + q_2,\ 0 \le n_2^{(i)} < N_2,\ 0 \le q_2 < O_2 - 1$$

where the superscript T denotes a matrix transposition operation. Note that $O_1$, $O_2$ oversampling factors are assumed for the 2D DFT matrix from which matrix B is drawn. Note that $W_1$ is common across all layers. $W_2$ is a $2L \times N_3$ matrix, where the $i^{th}$ column corresponds to the linear combination coefficients of the 2L beams in the $i^{th}$ sub-band. Only the indices of the L selected columns of B are reported, along with the oversampling index taking on $O_1 O_2$ values. Note that $W_2$ are independent for different layers.

Regarding 3GPP NR Rel-15, for Type-II Port Selection codebook, only K (where $K \le 2N_1N_2$) beamformed CSI-RS ports are utilized in DL transmission, in order to reduce complexity. The $K \times N_3$ codebook matrix per layer takes on the form:

$$W = W_1^{PS} W_2$$

Here, $W_2$ follows the same structure as the conventional NR Rel-15 Type-II Codebook, and are layer specific. $W_1^{PS}$ is a $K \times 2L$ block-diagonal matrix with two identical diagonal blocks, i.e., $$W_1^{PS} = \begin{bmatrix} E & 0 \\ 0 & E \end{bmatrix},$$

and E is a $K/2 \times L$ matrix whose columns are standard unit vectors, as follows:

$$E = \begin{bmatrix} e_{\mathrm{mod}(m_{PS}d_{PS},K/2)}^{(K/2)} & e_{\mathrm{mod}(m_{PS}d_{PS}+1,K/2)}^{(K/2)} & \cdots & e_{\mathrm{mod}(m_{PS}d_{PS}+L-1,K/2)}^{(K/2)} \end{bmatrix},$$

where $e_i^{(K)}$ is a standard unit vector with a 1 at the $i^{th}$ location. Here $d_{PS}$ is an RRC parameter which takes on the values $\{1, 2, 3, 4\}$ under the condition $d_{PS} \le \min(K/2, L)$, whereas $m_{PS}$ takes on the values $$\left\{0, \ldots, \left\lceil \frac{K}{2d_{PS}} \right\rceil - 1 \right\}$$

and is reported as part of the UL CSI feedback overhead. $W_1$ is common across all layers. In various embodiments, the above parameters comply with 3GPP Technical Specification ("TS") 38.214 definitions and procedures.

For $K=16$, $L=4$ and $d_{PS}=1$, the 8 possible realizations of E corresponding to $m_{PS}=\{0, 1, \ldots, 7\}$ are as follows:

$$\begin{bmatrix} 1&0&0&0\\0&1&0&0\\0&0&1&0\\0&0&0&1\\0&0&0&0\\0&0&0&0\\0&0&0&0\\0&0&0&0 \end{bmatrix}, \begin{bmatrix} 0&0&0&0\\1&0&0&0\\0&1&0&0\\0&0&1&0\\0&0&0&1\\0&0&0&0\\0&0&0&0\\0&0&0&0 \end{bmatrix}, \begin{bmatrix} 0&0&0&0\\0&0&0&0\\1&0&0&0\\0&1&0&0\\0&0&1&0\\0&0&0&1\\0&0&0&0\\0&0&0&0 \end{bmatrix}, \begin{bmatrix} 0&0&0&0\\0&0&0&0\\0&0&0&0\\1&0&0&0\\0&1&0&0\\0&0&1&0\\0&0&0&1\\0&0&0&0 \end{bmatrix},$$

$$\begin{bmatrix} 0&0&0&0\\0&0&0&0\\0&0&0&0\\0&0&0&0\\1&0&0&0\\0&1&0&0\\0&0&1&0\\0&0&0&1 \end{bmatrix}, \begin{bmatrix} 0&0&0&1\\0&0&0&0\\0&0&0&0\\0&0&0&0\\0&0&0&0\\1&0&0&0\\0&1&0&0\\0&0&1&0 \end{bmatrix}, \begin{bmatrix} 0&0&1&0\\0&0&0&1\\0&0&0&0\\0&0&0&0\\0&0&0&0\\0&0&0&0\\1&0&0&0\\0&1&0&0 \end{bmatrix}, \begin{bmatrix} 0&1&0&0\\0&0&1&0\\0&0&0&1\\0&0&0&0\\0&0&0&0\\0&0&0&0\\0&0&0&0\\1&0&0&0 \end{bmatrix}$$

When $d_{PS}=2$, the 4 possible realizations of E corresponding to $m_{PS}=\{0, 1, 2, 3\}$ are as follows $$\begin{bmatrix} 1&0&0&0\\0&1&0&0\\0&0&1&0\\0&0&0&1\\0&0&0&0\\0&0&0&0\\0&0&0&0\\0&0&0&0 \end{bmatrix}, \begin{bmatrix} 0&0&0&0\\0&0&0&0\\1&0&0&0\\0&1&0&0\\0&0&1&0\\0&0&0&1\\0&0&0&0\\0&0&0&0 \end{bmatrix}, \begin{bmatrix} 0&0&0&0\\0&0&0&0\\0&0&0&0\\0&0&0&0\\1&0&0&0\\0&1&0&0\\0&0&1&0\\0&0&0&1 \end{bmatrix}, \begin{bmatrix} 0&0&1&0\\0&0&0&1\\0&0&0&0\\0&0&0&0\\0&0&0&0\\0&0&0&0\\1&0&0&0\\0&1&0&0 \end{bmatrix}.$$

When $d_{PS}=3$, the 3 possible realizations of E corresponding of $m_{PS}=\{0, 1, 2\}$ are as follows $$\begin{bmatrix} 1&0&0&0\\0&1&0&0\\0&0&1&0\\0&0&0&1\\0&0&0&0\\0&0&0&0\\0&0&0&0\\0&0&0&0 \end{bmatrix}, \begin{bmatrix} 0&0&0&0\\0&0&0&0\\0&0&0&0\\1&0&0&0\\0&1&0&0\\0&0&1&0\\0&0&0&1\\0&0&0&0 \end{bmatrix}, \begin{bmatrix} 0&0&1&0\\0&0&0&1\\0&0&0&0\\0&0&0&0\\0&0&0&0\\0&0&0&0\\1&0&0&0\\0&1&0&0 \end{bmatrix}$$

When $d_{PS}=4$, the 2 possible realizations of E corresponding of $m_{PS}=\{0, 1\}$ are as follows $$\begin{bmatrix} 1&0&0&0\\0&1&0&0\\0&0&1&0\\0&0&0&1\\0&0&0&0\\0&0&0&0\\0&0&0&0\\0&0&0&0 \end{bmatrix}, \begin{bmatrix} 0&0&0&0\\0&0&0&0\\0&0&0&0\\0&0&0&0\\1&0&0&0\\0&1&0&0\\0&0&1&0\\0&0&0&1 \end{bmatrix}.$$

To summarize, $m_{PS}$ parametrizes the location of the first 1 in the first column of E, whereas $d_{PS}$ represents the row shift corresponding to different values of $m_{PS}$.

Regarding 3GPP NR Rel-15, the Type-I codebook is the baseline codebook for NR, with a variety of configurations. The most common utility of Rel-15 Type-I codebook is a special case of NR Rel-15 Type-II codebook with L=1 for Rank Indicator ("RI")=1, 2, where a phase coupling value is reported for each sub-band, i.e., $W_2$ is $2 \times N_3$, with the first row equal to [1, 1, . . . , 1] and the second row equal to $[e^{j2\pi\phi_0}, \ e^{j2\pi\phi_{N_3-1}}]$ Under specific configurations, $\phi_0 = \phi_1 \ldots = \phi$ i.e., wideband reporting. For RI>2, different beams are used for each pair of layers. The NR Rel-15 Type-I codebook may be depicted as a low-resolution version of NR Rel-15 Type-II codebook with spatial beam selection per layer-pair and phase combining only.

Regarding the 3GPP NR Rel-16 Type-II Codebook, it is assumed that the gNB is equipped with a two-dimensional (2D) antenna array with $N_1$, $N_2$ antenna ports per polarization placed horizontally and vertically and communication occurs over $N_3$ PMI subbands. A PMI subband consists of a set of resource blocks, each resource block consisting of a set of subcarriers. In such case, $2N_1N_2N_3$ CSI-RS ports are utilized to enable DL channel estimation with high resolution for NR Rel-16 Type-II codebook.

In order to reduce the UL feedback overhead, a Discrete Fourier transform (DFT)-based CSI compression of the spatial domain is applied to L dimensions per polarization, where $L \leq N_1N_2$. Similarly, additional compression in the frequency domain is applied, where each beam of the frequency-domain precoding vectors is transformed using an inverse DFT matrix to the delay domain, and the magnitude and phase values of a subset of the delay-domain coefficients are selected and fed back to the gNB as part of the CSI report.

The $2N_1N_2 \times N_3$ codebook per layer takes on the form:

$$W = W_1 \tilde{W}_2 W_f^H$$

where $W_1$ is a $2N_1N_2 \times 2L$ block-diagonal matrix ($L \leq N_1N_2$) with two identical diagonal blocks, i.e., $$W_1 = \begin{bmatrix} B & 0 \\ 0 & B \end{bmatrix},$$

and B is an $N_1N_2 \times L$ matrix with columns drawn from a 2D oversampled DFT matrix, as follows:

$$u_m = \begin{bmatrix} 1 & e^{j\frac{2\pi m}{O_2 N_2}} & \cdots & e^{j\frac{2\pi m(N_2-1)}{O_2 N_2}} \end{bmatrix},$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T,$$

$$B = \begin{bmatrix} v_{l_0,m_0} & v_{l_1,m_1} & \cdots & v_{l_{L-1},m_{L-1}} \end{bmatrix},$$

$$l_i = O_1 n_1^{(i)} + q_1, \ 0 \leq n_1^{(i)} < N_1, \ 0 \leq q_1 < O_1 - 1,$$

$$m_i = O_2 n_2^{(i)} + q_2, \ 0 \leq n_2^{(i)} < N_2, \ 0 \leq q_2 < O_2 - 1$$

where the superscript T denotes a matrix transposition operation. Note that $O_1$, $O_2$ oversampling factors are assumed for the 2D DFT matrix from which matrix B is drawn. Note that $W_1$ is common across all layers. In various embodiments, the above parameters comply with 3GPP TS 38.214 definitions and procedures.

$W_f$ is an $N_3 \times M$ matrix (where $M < N_3$) with columns selected from a critically-sampled size-$N_3$ DFT matrix, as follows:

$$W_f = \begin{bmatrix} f_{k_0} & f_{k_1} & \cdots & f_{k_{M'-1}} \end{bmatrix}, \ 0 \leq k_i < N_3 - 1$$

$$f_k = \begin{bmatrix} 1 & e^{-j\frac{2\pi k}{N_3}} & \cdots & e^{-j\frac{2\pi k(N_3-1)}{N_3}} \end{bmatrix}^T$$

Only the indices of the L selected columns of B are reported, along with the oversampling index taking on $O_1 O_2$ values. Similarly, for $W_f$, only the indices of the M selected columns out of the predefined size-$N_3$ DFT matrix are reported. In the sequel the indices of the M dimensions are referred as the selected Frequency Domain ("FD") basis indices. Hence, L, M represent the equivalent spatial and frequency dimensions after compression, respectively. Finally, the $2L \times M$ matrix $\tilde{W}_2$ represents the linear combination coefficients ("LCCs") of the spatial and frequency DFT-basis vectors. Both $\tilde{W}_2$, $W_f$ are selected independent for different layers.

Magnitude and phase values of an approximately $\beta$ fraction of the 2LM available coefficients are reported to the gNB ($\beta < 1$) as part of the CSI report. Note that coefficients with zero magnitude are indicated via a per-layer bitmap. Since all coefficients reported within a layer are normalized with respect to the coefficient with the largest magnitude (strongest coefficient), the relative value of that coefficient is set to unity, and no magnitude or phase information is explicitly reported for this coefficient. Only an indication of the index of the strongest coefficient per layer is reported. Hence, for a single-layer transmission, magnitude and phase values of a maximum of [$2\beta LM$]−1 coefficients (along with the indices of selected L, M DFT vectors) are reported per layer, leading to significant reduction in CSI report size, compared with reporting $2N_1N_2 \times N_3 - 1$ coefficients' information.

Regarding 3GPP NR Rel-16, for Type-II Port Selection codebook, only K (where $K \leq 2N_1N_2$) beamformed CSI-RS ports are utilized in DL transmission, in order to reduce complexity. The $K \times N_3$ codebook matrix per layer takes on the form:

$$W = W_1^{PS} \tilde{W}_2 W_f^H$$

Here, $\tilde{W}_2$ and $W_3$ follow the same structure as the conventional NR Rel-16 Type-II Codebook, where both are layer specific. The matrix $W_1^{PS}$ is a $K \times 2L$ block-diagonal matrix with the same structure as that in the NR Rel-15 Type-II Port Selection Codebook.

Regarding UE Sounding Reference Signal ("SRS") configuration, as discussed in 3GPP TS 38.214, the UE may be configured with one or more SRS resource sets as configured by the higher-layer parameter SRS-ResourceSet, where each SRS resource set is associated with $K \geq 1$ SRS resources (higher-layer parameter SRS-Resource), where the maximum value of K is indicated by UE capability. The SRS resource set applicability is configured by the higher-layer parameter usage in SRS-ResourceSet. The higher-layer parameter SRS-Resource configures some SRS parameters, including the SRS resource configuration identity (srs-ResourceId), the number of SRS ports (nrofSRS-Ports) with default value of one, and the time-domain behavior of SRS resource configuration (resourceType).

The UE may be configured by the higher-layer parameter resourceMapping in SRS-Resource with an SRS resource occupying $N_S \in \{1, 2, 4\}$ adjacent symbols within the last 6 symbols of the slot, where all antenna ports of the SRS resources are mapped to each symbol of the resource.

For a UE configured with one or more SRS resource configuration(s), and when the higher-layer parameter resource Type in SRS-Resource is set to 'aperiodic':

The UE receives a configuration of SRS resource sets,
The UE receives a downlink DCI, a group common DCI, or an uplink DCI based command where a codepoint of the DCI may trigger one or more SRS resource set(s). For SRS in a resource set with usage set to 'codebook' or 'antennaSwitching', the minimal time interval between the last symbol of the Physical Downlink Control Channel ("PDCCH") triggering the aperiodic SRS transmission and the first symbol of SRS resource is $N_2$. Otherwise, the minimal time interval between the last symbol of the PDCCH triggering the aperiodic SRS transmission and the first symbol of SRS resource is $N_2+14$. The minimal time interval in units of Orthogonal Frequency Division Multiplexing ("OFDM") symbols is counted based on the minimum subcarrier spacing between the PDCCH and the aperiodic SRS.

If the UE is configured with the higher-layer parameter spatialRelationInfo containing the ID of a reference 'ssb-Index', then the UE transmits the target SRS resource with the same spatial domain transmission filter used for the reception of the reference Synchronization Signal/Physical Broadcast Channel ("SS/PBCH") block. If the higher-layer parameter spatialRelationInfo contains the ID of a reference 'csi-RS-Index', the UE transmits the target SRS resource with the same spatial domain transmission filter used for the reception of the reference periodic CSI-RS or of the reference semi-persistent CSI-RS, or of the latest reference aperiodic CSI-RS. If the higher-layer parameter spatialRelationInfo contains the ID of a reference 'srs', the UE transmits the target SRS resource with the same spatial domain transmission filter used for the transmission of the reference periodic SRS or of the reference semi-persistent SRS or of the reference aperiodic SRS.

The update command contains spatial relation assumptions provided by a list of references to reference signal IDs, one per element of the updated SRS resource set. Each ID in the list refers to a reference SS/PBCH block, non-zero-power ("NZP") CSI-RS resource configured on serving cell indicated by Resource Serving Cell ID field in the update command if present, same serving cell as the SRS resource set otherwise, or SRS resource configured on serving cell and uplink bandwidth part ("BWP") indicated by Resource Serving Cell ID field and Resource BWP ID field in the update command if present, same serving cell and bandwidth part as the SRS resource set otherwise.

When the UE is configured with the higher-layer parameter usage in SRS-ResourceSet set to 'antennaSwitching', the UE expects to not be configured with different spatial relations for SRS resources in the same SRS resource set.

For Physical Uplink Control Channel ("PUCCH") and SRS on the same carrier, a UE does not transmit SRS when semi-persistent and periodic SRS are configured in the same symbol(s) with PUCCH carrying only CSI report(s), or only L1-RSRP report(s), or only L1-SINR report(s). A UE does not transmit SRS when semi-persistent or periodic SRS is configured or aperiodic SRS is triggered to be transmitted in the same symbol(s) with PUCCH carrying HARQ-ACK, link recovery request (as defined in clause 9.2.4 of 3GPP TS 38.213) and/or Scheduling Request ("SR"). In the case that SRS is not transmitted due to overlap with PUCCH, only the SRS symbol(s) that overlap with PUCCH symbol(s) are dropped. PUCCH is not to be transmitted when aperiodic SRS is triggered to be transmitted to overlap in the same symbol with PUCCH carrying semi-persistent/periodic CSI report(s) or semi-persistent/periodic L1-RSRP report(s) only, or only L1-SINR report(s). As used herein, "HARQ-ACK" may represent collectively the Positive Acknowledge ("ACK") and the Negative Acknowledge ("NACK") and Discontinuous Transmission ("DTX"). ACK means that a TB is correctly received while NACK (or NAK) means a TB is erroneously received and DTX means that no TB was detected. "HARQ" refers to the Hybrid Automatic Repeat Request error-control technique for data transmission.

When the UE is configured with the higher-layer parameter usage in SRS-ResourceSet set to 'antennaSwitching', and a guard period of Y symbols is configured according to Clause 6.2.1.2 of 3GPP TS 38.214, the UE is to use the same priority rules as defined above during the guard period as if SRS was configured.

Regarding UE sounding procedure for DL CSI acquisition, when the UE is configured with the higher-layer parameter usage in SRS-ResourceSet set as 'antennaSwitching', the UE may be configured with one configuration depending on the indicated UE capability supportedSRS-TxPortSwitch, which takes on the values {'t1r2', 't1r1-t1r2', 't2r4', 't1r4', 't1r1-t1r2-t1r4', 't1r4-t2r4', 't1r1-t1r2-t2r2-t2r4', 't1r1-t1r2-t2r2-t1r4-t2r4', 't1r1', 't2r2', 't1r1-t2r2', 't4r4', 't1r1-t2r2-t4r4'}

For 1T2R, up to two SRS resource sets configured with a different value for the higher-layer parameter resource Type in SRS-ResourceSet set, where each set has two SRS resources transmitted in different symbols, each SRS resource in a given set consisting of a single SRS port, and the SRS port of the second resource in the set is associated with a different UE antenna port than the SRS port of the first resource in the same set, or For 2T4R, up to two SRS resource sets configured with a different value for the higher-layer parameter resource-Type in SRS-ResourceSet set, where each SRS resource set has two SRS resources transmitted in different symbols, each SRS resource in a given set consisting of two SRS ports, and the SRS port pair of the second resource is associated with a different UE antenna port pair than the SRS port pair of the first resource, or For 1T4R, zero or one SRS resource set configured with higher-layer parameter resourceType in SRS-ResourceSet set to 'periodic' or 'semi-persistent' with four SRS resources transmitted in different symbols, each SRS resource in a given set consisting of a single SRS port, and the SRS port of each resource is associated with a different UE antenna port, and For 1T4R, zero or two SRS resource sets each configured with higher-layer parameter resourceType in SRS-ResourceSet set to 'aperiodic' and with a total of four SRS resources transmitted in different symbols of two different slots, and where the SRS port of each SRS resource in the given two sets is associated with a different UE antenna port. The two sets are each configured with two SRS resources, or one set is configured with one SRS resource and the other set is configured with three SRS resources.

For 1T=1R, or 2T=2R, or 4T=4R, up to two SRS resource sets each with one SRS resource, where the number of SRS ports for each resource is equal to 1, 2, or 4.

The UE is configured with a guard period of Y symbols, in which the UE does not transmit any other signal, in the case the SRS resources of a set are transmitted in the same slot. The guard period is in-between the SRS resources of the set. The value of Y is 2 when the OFDM sub-carrier spacing is 120 kHz, otherwise Y=1.

For 1T2R, 1T4R or 2T4R, the UE expects to not be configured or triggered with more than one SRS resource set with higher-layer parameter usage set as 'antennaSwitching' in the same slot. For 1T=1R, 2T=2R or 4T=4R, the UE expects to not be configured or triggered with more than one SRS resource set with higher-layer parameter usage set as 'antennaSwitching' in the same symbol.

Disclosed are procedures for providing efficient techniques for CSI-RS beamforming and uplink CSI feedback reporting that improve the efficiency of Type-II port-selection codebook. More specifically, a flexible CSI feedback reporting structure is discussed that can be efficient under different levels of UL-DL channel reciprocity strength.

FIG. 1 depicts a wireless communication system 100 for reciprocity-based Type-II codebook with UE-assisted parameter combination selection, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the 5G system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 140.

In some embodiments, the remote units 105 communicate with an application server 151 (or other communication peer) via a network connection with the mobile core network 140. For example, an application 107 in a remote unit 105 (e.g., web browser, media client, telephone and/or Voice-over-Internet-Protocol ("VoIP") application) may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR operation on unlicensed spectrum (referred to as "NR-U"), the base unit 121 and the remote unit 105 communicate over unlicensed (i.e., shared) radio spectrum.

In various embodiments, the remote unit 105 receives a CSI codebook configuration 125 from the base unit 121. As described in greater detail below, the configuration 125 may include multiple sets of parameter combinations.

Moreover, after receiving a set of CSI reference signals ("CSI-RS"), the remote unit 105 may select a subset of the multiple sets of parameter combinations (i.e., selects at least one of the parameter combinations) and indicates the selected parameter combination(s) in a CSI report 127 sent to the base unit 121.

In one embodiment, the mobile core network 140 is a 5GC or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO") and/or Public Mobile Land Network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, a Unified Data Management function ("UDM") and a User Data Repository ("UDR"). Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network (DN), in the 5G architecture. The AMF 143 is responsible for termination of NAS signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration of the UPF 141 for proper traffic routing.

The PCF 147 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the to mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

While FIG. 1 depicts components of a 5G RAN and a 5G core network, the described embodiments for reciprocity-based Type-II codebook with UE-assisted parameter combination selection apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "RAN node" is used for the base station/base unit, but it is replaceable by any other radio access node, e.g., gNB, ng-eNB, eNB, Base Station ("BS"), Access Point ("AP"), etc. Additionally, the term "UE" is used for the mobile station/remote unit, but it is replaceable by any other remote device, e.g., remote unit, MS, ME, etc. Further, the operations are described mainly in the context of 5G NR. However, the below described solutions/methods are also equally applicable to other mobile communication systems supporting reciprocity-based Type-II codebook with UE-assisted parameter combination selection.

As mentioned previously, two issues are expected to arise under DL channel estimation based on partial UL channel reciprocity under FDD mode. First, the UL channel estimated at the RAN node 210 may not be accurate due to conventional channel estimation issues that are well-known in the field of wireless communications, e.g., channel quantization and hardware impairments. Second, the channel may vary within the time between the transmission of the Sounding Reference Signals ("SRS") for UL CSI acquisition and the transmission of the beamformed CSI-RSs, whose beamforming is based on the channel estimated via SRS transmission. Only the UE 205 would be partly able to measure the instantaneous correlation between the UL channel estimate (represented in the CSI-RS beamforming) and the DL channel, based on the characteristics of the beamformed DL channel estimated at the UE 205 (i.e., remote unit 105). More details can be found below.

In general, a UE 205 is configured by higher-layers with one or more CSI-ReportConfig Reporting Settings, where each Reporting Setting may configure at least one CodebookConfig Codebook Configuration or one reportQuantity Reporting Quantity, or both, for CSI Reporting. Each Codebook Configuration represents at least one codebookType Codebook type, which includes indicators representing at least one or more of a CSI-RS Resource Indicator ("CRI"), a Synchronization-Signal Block Resource Indicator ("SSBRI"), a Rank Indicator ("RI"), a Precoding Matrix Indicator ("PMI"), a Channel Quality Indicator ("CQI"), a Layer Indicator ("LI"), a Layer-1 Reference Signal Received Power "(L1-RSRP") and a Layer-1 Signal-to-Interference-plus-Noise Ratio ("L1-SINR"). Several embodiments are described below. According to a possible embodiment, one or more elements or features from one or more of the described embodiments may be combined.

Regarding indication of reciprocity-based codebook, the network may configure a UE 205 with a reciprocity-based codebook as part of CSI feedback reporting, via one or more of the indications discussed below with reference to FIGS. 3-5.

Figure 2:
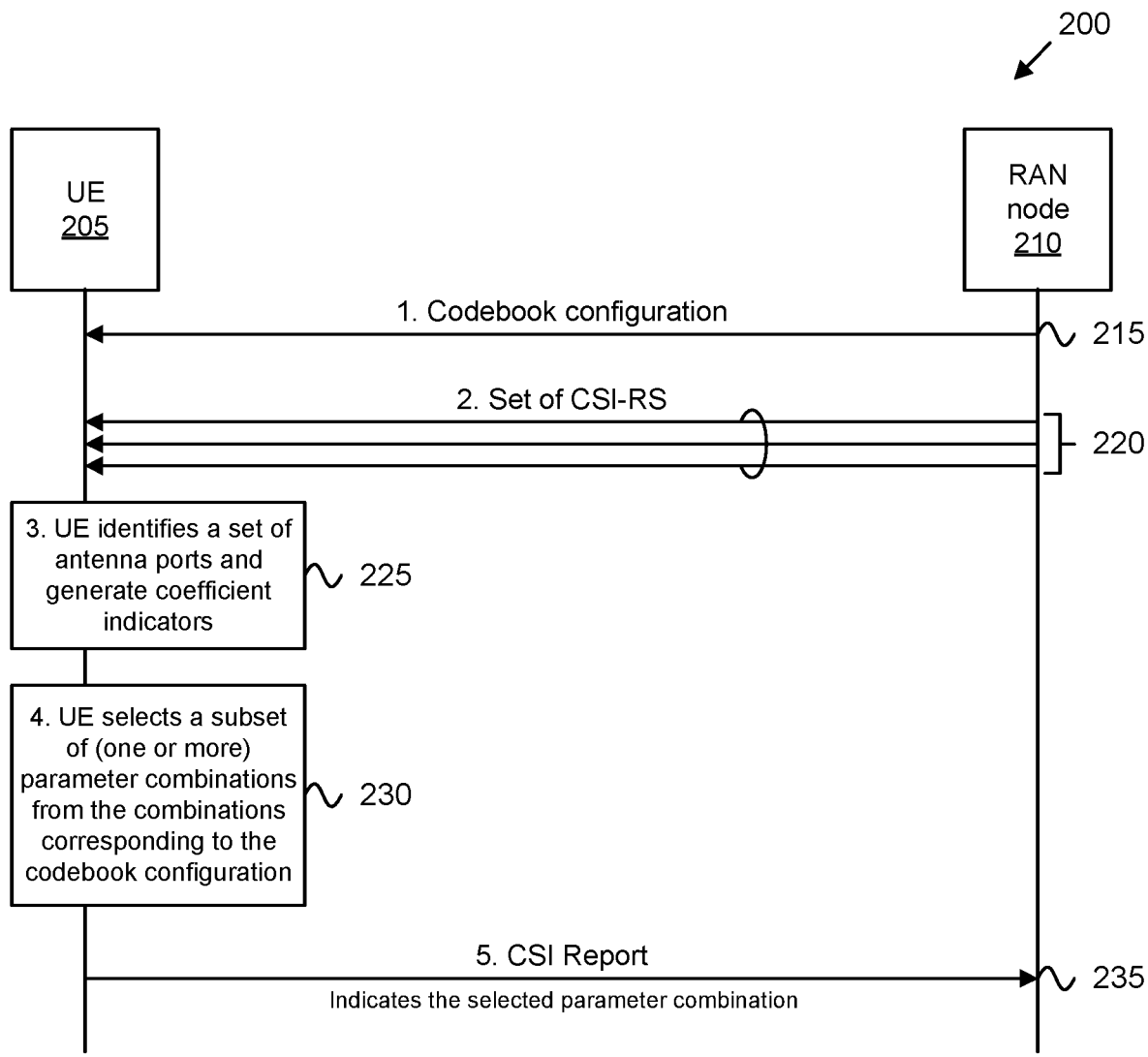
FIG. 2 is a call-flow diagram illustrating one embodiment of configuring a reciprocity-based Type-II CSI codebook and UE-assisted parameter combination selection.

FIG. 2 depicts a first procedure 200 for configuring a reciprocity-based Type-II CSI codebook and UE-assisted parameter combination selection, according to embodiments of the disclosure. The first procedure involves a UE 205 and a RAN node 210, such as a gNB. The UE 205 may be one embodiment of the remote unit 105, while the RAN node 210 may be one embodiment of the base unit 121.

As depicted, at Step 1 the UE 205 receives a codebook configuration from the RAN node 210 (see messaging 215). Here, the codebook configuration contains a set of at least two parameter combinations, e.g., for reporting CSI feedback.

At Step 2, the RAN node 210 transmits a set of CSI reference signals (see signaling 220). Note that the set of CSI reference signals (i.e., CSI-RS) may be beamformed reference signals ("RSs").

At Step 3, the UE 205 identifies a set of antenna ports based on the set of CSI reference signals and generates at least one coefficient amplitude indicator and one coefficient phase indicator for each antenna port in the identified set of antenna ports (see block 225).

At Step 4, the UE 205 selects a subset of at least one parameter combination from the parameter combinations corresponding to the codebook configuration (see block 230). At Step 5, the UE 205 transmits to the RAN node 210 a CSI report indicating the selected parameter combination to the RAN node 210 (see messaging 235). Here, the CSI report may also include a rank indicator that indicates the number of transmission layers and the generated at least one amplitude and phase coefficient indicator.

FIG. 3 depicts an example Abstract Syntax Notation 1 ("ASN.1") implementation of a reciprocity-based codebook configuration 300, according to a first embodiment. Here, the RAN node 210 may send the codebook configuration 300 to the UE 205. The original ASN.1 code for this IE can be found in Clause 6.3.2 of 3GPP TS 38.331.

According to the first embodiment, the network (i.e., RAN) introduces one or more additional values to the higher-layer parameter CodebookType (see block 305). In one embodiment, the parameter CodebookType may be part of one or more Codebook Configuration Information Elements ("IEs") that were introduced in Release 15 ("Rel-15") and Rel-16, i.e., CodebookConfig, or CodebookConfig-r16, respectively. In another embodiment, the parameter CodebookType may be part of a new Codebook Configuration IE introduced in Release 17 ("Rel-17") and/or Release 18 ("Rel-18"), i.e., CodebookConfig-r17 or CodebookConfig-r18.

All the Codebook Configuration IEs are part of the CSI-ReportConfig Reporting Setting IE. Examples of the additional values of the CodebookType parameter are 'typeII-PortSelection-r17', or 'typeII-Reciprocity'.

FIG. 4 depicts an example ASN.1 implementation of a reciprocity-based codebook configuration 400, according to a second embodiment. Here, the RAN node 210 may send the codebook configuration 400 to the UE 205. The original ASN.1 code for this IE can be found in Clause 6.3.2 of 3GPP TS 38.331.

According to the second embodiment, the network (i.e., RAN) introduces an additional higher-layer parameter, e.g., Channel Reciprocity parameter 405 depicted here as channelReciprocity; within the CSI-ReportConfig Reporting Setting IE that configures the UE 205 with CSI feedback reporting based on channel reciprocity. The Channel Reciprocity parameter 405 may appear in different sub-elements of the Reporting Setting IE.

FIG. 5 depicts an example ASN.1 implementation of a reciprocity-based codebook configuration 500, according to a third embodiment. Here, the RAN node 210 may send the codebook configuration 500 to the UE 205. According to the third embodiment, the network (i.e., RAN) introduces an additional higher-layer parameter, e.g., Channel Reciprocity parameter 505 depicted here as channelReciprocity; within the Codebook Configuration CodebookConfig IE.

In one embodiment, the new parameter is under the Codebook Configuration IE, e.g., CodebookConfig, CodebookConfig-r16. In another embodiment, the new parameter is under a new configuration such as CodebookConfig-r17. In yet another embodiment, the new parameter is a sub-parameter within the higher-layer parameter codebookType, whenever the Codebook Type is set to 'typeII-PortSelection,' 'typeII-PortSelection-r16' or another Type-II Port Selection Codebook, e.g., 'typeII-PortSelection-r17'.

FIG. 6 depicts an example ASN.1 implementation of a reciprocity-based codebook configuration 600 with two configured parameter combinations, according to embodiments of the disclosure. Here, the RAN node 210 may send the codebook configuration 300 to the UE 205. The original ASN.1 code for this IE can be found in Clause 6.3.2 of 3GPP TS 38.331.

Regarding multiple parameter combinations under different reciprocity conditions, due to the exploitation of the FDD reciprocity of the channel, the RAN node 210 may transmit beamformed CSI-RSs, where the CSI-RS beamforming is based on the UL channel estimated via SRS transmission.

The beamforming can then flatten the channel in the frequency domain, i.e., a fewer number of significant channel taps, i.e., taps with relatively large power, are observed at the UE 205, compared with non-beamformed CSI-RS transmission. Such beamforming may result in a fewer number of coefficients, corresponding to fewer FD basis indices, being fed back in the CSI report. The extent of such reduction in the number of FD basis indices considered in the CSI report depends on the strength of the channel reciprocity.

Regarding parameter combination configuration, one approach to alleviate this issue is configuring the UE 205 with at least two sets of parameter combinations related to the codebook, where each parameter combination includes a set of indicators corresponding to one or more of the number of non-zero coefficients (e.g., similar to parameter $\beta$ in Type-II Rel-16 Codebook described in Clause 5.2.2.2.5 of 3GPP NR TS 38.214), the number of FD basis indices (e.g., similar to parameter $p_v$, or $M_v$ in Type-II Rel-16 Codebook described in Clause 5.2.2.2.5 of 3GPP NR TS 38.214), the number of beams (e.g., similar to parameter L in Type-II Rel-16 Codebook described in Clause 5.2.2.2.5 of 3GPP NR TS 38.214) and the number of PMI sub-bands per CQI sub-band (e.g., similar to parameter numberOfPMISubbandsPerCQISubband in Type-II Rel-16 Codebook described in Clause 5.2.2.2.5 of 3GPP NR TS 38.214). Each parameter combination may be represented by one or more index values. For instance, the parameter combinations for the triplet $\{L, p_v, \beta\}$ may take on up to Q values, such that a parameter combination index can be represented with a value $q=1, \ldots, Q$.

In one embodiment, a UE 205 is configured with at least two parameter combinations as part of the codebook configuration. An example of this embodiment is depicted in FIG. 6 for the CodebookConfig Codebook Configuration Information Element ("IE"), where the two higher-layer parameters paramCombination-r17 and numberOfPMI-SubbandsPerCQI-Subband-r17 comprise a first parameter combination 605 and two additional higher-layer parameters paramCombination1-r17 and numberOfPMI-SubbandsPerCQI-Subband1-r17 comprise a second parameter combination 610.

In another embodiment, the higher-layer parameters paramCombination1-r17 and numberOfPMI-SubbandsPerCQI-Subband1-r17 are configured/indicated/provided in CSI-ReportConfig Reporting Setting or an additional Rel-17 IE e.g., TypeII-PortSelection-ParamComb comprising the two parameters that are configured/indicated/provided in CSI-ReportConfig Reporting Setting. The parameters may be conditioned and optionally present if a Type-II Port Selection Codebook, e.g., typeII-PortSelection-r16 is configured. In one example, the presence of the higher-layer parameters may implicitly indicate channel reciprocity is configured.

In another embodiment, a UE 205 is configured with either one parameter combination that is higher-layer configured within the codebook configuration, or a pre-determined parameter combination that is fixed, i.e., set by a rule. For instance, one parameter combination may be higher-layer configured, whereas a second parameter combination is not configured; instead, it is commonly known by the UE 205 and the network (i.e., RAN) to be a valid/default parameter combination that does not need to be indicated/configured/reported by the network.

In yet another embodiment, a UE 205 selects one or more parameter combinations from a set of parameter combinations that are defined by a rule. For instance, a set of Q fixed to codebook parameter combinations are commonly known to the network (i.e., RAN) and the UE 205 with pre-defined indices, where the UE 205 selects one or more of the Q parameter combinations.

Based on the aforementioned embodiments, the UE 205 selects one or more of the configured parameter combinations and indicates the selected parameter combination to the network/RAN node 210 either explicitly, e.g., feeding back an index of the selected parameter combination to the network/RAN node 210 as part of the CSI report, or implicitly, e.g., implied from the CSI report size that is fed back in the Uplink Control Information (UCI).

More details on both explicit and implicit indications of the parameter combination selection process are discussed in the next two sections, in addition to providing details onto setting the parameter combination across the SD basis indices and transmission layers reported in the CSI feedback report.

Regarding Explicit Parameter Combination Indication, in light of the previous section, there may be several approaches a UE 205 can adopt to explicitly indicate a selected parameter combination to a RAN node 210 (more generally to a network). Also, the UE 205 may select more than one parameter combination to be used for different codebook layers (denoted by $l=1, \ldots, v$) or spatial beams/dimensions (denoted by $i=0, \ldots, L-1$ for polarization-agnostic beams or $i=0, \ldots, 2L-1$ for polarization-specific beams), or both.

In one embodiment, a UE 205 may report (i.e., feed back) one indicator value with a bitwidth of k bits in a CSI report that indicates the selected codebook parameter combination, in one part of the CSI report. The value of k may depend on the number of configured codebook parameter combinations (denoted here by Q), for instance $k \triangleq \lceil \log_2 Q \rceil$, where the output of the operator $\lceil\alpha\rceil$ is the smallest integer value that is greater than or equal a real value $\alpha$. In one example, a UE 205 is configured with Q=2 codebook parameter combinations, where the UE 205 feeds back k=1 bit in Part 1 of the CSI report to indicate the selected parameter combination. This embodiment may reflect a scenario where one parameter combination is applied to all of beams within all transmission layers.

In another embodiment, a UE 205 may report (i.e., feed back) v indicator values with a bitwidth of k bits each in the CSI report that indicate the selected codebook parameter combination for each layer l=1, . . . , v, in one part of the CSI report. The value of k may depend on the number of configured codebook parameter combinations (denoted here by Q), for instance $k \triangleq \lceil \log_2 Q \rceil$. In one example, a UE 205 is configured with Q=2 codebook parameter combinations, where the UE 205 feeds back 2 indicator values for a rank v=2 codebook, with k=1 bit in Part 1 of the CSI report to indicate the selected parameter combination. This embodiment may reflect a scenario where the parameter combination is selected in a layer-specific manner, i.e., each transmission layer is assigned its own codebook parameter combination. Alternatively, a UE 205 may feedback v' indicator values for a rank v codebook, where the codebook layers are grouped into v' mutually exclusive layer groups, e.g., layer group j corresponds to the layer pair 2(j−1)+1, 2j, and v'=⌈v/2⌉.

In yet another embodiment, a UE 205 may report (i.e., feed back) L indicator values with a bitwidth of k bits each in the CSI report that indicate the selected codebook parameter combination for each spatial beam l=1, . . . , L−1, in one part of the CSI report. The value of k may depend on the number of configured codebook parameter combinations (denoted here by Q), for instance $k \lceil \log_2 Q \rceil$. In one example, a UE 205 is configured with Q=2 codebook parameter combinations, where the UE 205 feeds back L=4 indicator values representing the number of beams in a codebook, with k=1 bit in Part 1 of the CSI report to indicate the selected parameter combination. This embodiment may reflect a scenario where the parameter combination is selected in a beam-specific manner, i.e., each beam is assigned its own codebook parameter combination.

In another embodiment, a UE 205 may report (i.e., feed back) 2L indicator values with a bitwidth of k bits each in the CSI report that indicate the selected codebook parameter combination for each spatial beam i=1, . . . , 2L−1, in one part of the CSI report. The value of k may depend on the number of configured codebook parameter combinations (denoted here by Q), for instance $k \triangleq \lceil \log_2 Q \rceil$. In one example, a UE 205 is configured with Q=2 codebook parameter combinations, where the UE 205 feeds back 2L=8 indicator values representing the number of beams in a codebook, with k=1 bit in Part 1 of the CSI report to indicate the selected parameter combination. This embodiment may reflect a scenario where the parameter combination is selected in a beam-specific, polarization-specific manner, i.e., each beam in a given polarization is assigned its own codebook parameter combination.

In another embodiment, a UE 205 may report (i.e., feed back) Lxv indicator values with a bitwidth of k bits each in the CSI report that indicate the selected codebook parameter combination for each spatial beam i=1, . . . , L−1 in each transmission layer l=1, . . . , v, in one or more parts of the CSI report. The value of k may depend on the number of configured codebook parameter combinations (denoted here by Q), for instance $k \triangleq \lceil \log_2 Q \rceil$. In one example, a UE 205 is configured with Q=2 codebook parameter combinations, where the UE 205 feeds back Lv=8 indicator values in a rank-2 codebook with 4 beams, with k=1 bit in Part 1 of the CSI report to indicate the selected parameter combination. This embodiment may reflect a scenario where the parameter combination is selected in a beam-specific, layer-specific manner, i.e., each beam in a given transmission layer is assigned its own codebook parameter combination. Alternatively, a UE 205 may report (i.e., feed back) Lxv' indicator values for a rank v codebook, where the codebook layers are grouped into v' mutually exclusive transmission layer groups, e.g., layer group j corresponds to the layer pair 2(j−1)+1, 2j, and v'=⌈v/2⌉.

In one more embodiment, a UE 205 may report (i.e., feed back) 2Lxv indicator values with a bitwidth of k bits each in the CSI report that indicate the selected codebook parameter combination for each spatial beam i=1, . . . , 2L−1 in each layer l=1, . . . , v, in one or more parts of the CSI report. The value of k may depend on the number of configured codebook parameter combinations (denoted here by Q), for instance $k \triangleq \rceil \log_2 Q \lceil$. In one example, a UE 205 is configured with Q=2 codebook parameter combinations, where the UE 205 feeds back 2Lv=16 indicator values in a rank-2 codebook with 4 beams, with k=1 bit in Part 1 of the CSI report to indicate the selected parameter combination. This embodiment may reflect a scenario where the parameter combination is selected in a beam-specific, polarization-specific and layer-specific manner, i.e., each beam per polarization in a given transmission layer is assigned its own codebook parameter combination. Alternatively, a UE 205 may feedback 2Lxv' indicator values for a rank v codebook, where the codebook layers are grouped into v' mutually exclusive layer groups, e.g., layer group j corresponds to the layer pair 2(j−1)+1, 2j, and v'=⌈v/2⌉.

Regarding Implicit Parameter Combination Indication, instead of explicit parameter combination indication in a CSI report, a UE 205 may select one or more of Q configured parameter combinations without the need of explicitly reporting the selected parameter. Different embodiments of this concept are provided below. Note that a combination of one or more features or elements of one embodiment with another is not precluded.

In one embodiment, a UE 205 can be configured to assign codebook parameter combinations on a layer-index basis, corresponding to the different transmission layer information fed back in the CSI report. In one example, a UE 205 with Q≥v codebook parameter combinations configuring the UE 205 (or set by a rule, or otherwise) is expected to use a different codebook parameter combination for each transmission layer l=1, . . . , v, using a predefined mapping between the layer index and the configured parameter combination index. In another example, a UE 205 configured with two codebook parameter combinations is expected to use a first of two configured (or set by a rule, or otherwise) codebook parameter combinations with the first two layers of the codebook, whereas the UE 205 may use a second of two configured (or set by a rule, or otherwise) codebook parameter combinations with the subsequent layers of the codebook.

In another embodiment, a UE 205 can be configured to assign codebook parameter combinations based on the rank of a codebook. In one example, a UE 205 with Q≥v codebook parameter combinations configuring the UE 205 (or set by a rule, or otherwise) is expected to use the same codebook parameter combination for all transmission layers l=1, . . . , v, of a codebook with rank v, however the UE 205 may use a different codebook parameter combination for all transmission layers l'=1, . . . , v', where v≠v', using a predefined mapping between the reported rank and the configured parameter combination index. In another example, a UE 205 configured with two codebook parameter combinations is expected to use a first of two configured (or set by a rule, or otherwise) codebook parameter combinations for all layers of a codebook with a reported rank v≤2, whereas the UE 205 may use a second of two configured (or set by a rule, or otherwise) codebook parameter combinations for all layers of a codebook with a reported rank v>2.

In yet embodiment, a UE 205 can be configured to assign codebook parameter combinations based on a beam index i=0, . . . , L−1 in the CSI report. In one example, a UE 205 with Q≥L codebook parameter combinations configuring the UE 205 (or set by a rule, or otherwise) is expected to use a different codebook parameter combination for each beam l=0, . . . , L−1, using a predefined mapping between the beam index and the configured parameter combination index. In another example, a UE 205 configured with two codebook parameter combinations is expected to use a first of two configured (or set by a rule, or otherwise) codebook parameter combinations with the first two beams of the codebook, whereas the UE 205 may use a second of two configured (or set by a rule, or otherwise) codebook parameter combinations with the subsequent beams of the codebook.

In another embodiment, a UE 205 can be configured to assign codebook parameter combinations based on the number of beams L configured in a codebook. In one example, a UE 205 with Q≥L codebook parameter combinations configuring the UE 205 (or set by a rule, or otherwise) is expected to use the same codebook parameter combination for all beams l=0, . . . , L−1, of a codebook with L beams, however the UE 205 may use a different codebook parameter combination for all beams i'=0, . . . , L−1, where L≠L', using a predefined mapping between the number of beams and the configured parameter combination index. In another example, a UE 205 configured with two codebook parameter combinations is expected to use a first of two configured (or set by a rule, or otherwise) codebook parameter combinations for all layers of a codebook with a configure number of beams L≤2, whereas the UE 205 may use a second of two configured (or set by a rule, or otherwise) codebook parameter combinations for all layers of a codebook with a configured number of beams L>2.

Regarding Combined embodiments for CSI Reporting with flexible Codebook Parameter Combinations, as mentioned previously, one or more elements or features from one or more of the described embodiments in this disclosure may be combined. In the remainder of this section, a few examples are provided for such combinations to describe the reciprocity-based codebook, as follows.

Example 1: A new higher-layer parameter, e.g., channelReciprocity, is introduced within the CSI-ReportConfig Reporting Setting IE that configures the UE 205 with CSI feedback reporting based on channel reciprocity. The Channel Reciprocity parameter may appear in different sub-elements of the Reporting Setting IE. When this parameter is configured, an additional higher-layer parameter, e.g., paramCombination1-r16 (other than a mandatory higher-layer parameter paramCombination-r16), is triggered in the CodebookConfig-r16 Codebook Configuration IE, where this parameter is optional (conditioned on the configuration of the channelReciprocity parameter).

Also, when the higher-layer parameter channelReciprocity is set to 'true,' the higher-layer parameter codebookType representing the codebook type within the Codebook Configuration IE must be set to 'typeII-PortSelection-r16'. A UE 205 that is configured with a Reporting Setting with the higher-layer parameter channelReciprocity set to 'true' would feed back a CSI report composed of two parts, where a one bit indicator is reported in Part 1 of the CSI report, e.g., paramCombinationIndex that indicates the selected parameter combination out of either the configured higher-layer parameters paramCombination-r16 or paramCombination1-r16, where the selected parameter combination would be applied to all transmission layers reported in the codebook.

Example 2: A new higher-layer parameter, e.g., channelReciprocity, is introduced within the Codebook Configuration CodebookConfig IE that configures the UE 205 with CSI feedback reporting based on channel reciprocity. When this parameter is configured, an additional higher-layer parameter, e.g., paramCombination1-r16 (other than a mandatory higher-layer parameter paramCombination-r16), is triggered in the CodebookConfig-r16 Codebook Configuration IE, where this parameter is optional (conditioned on the configuration of the channelReciprocity parameter).

Also, when the higher-layer parameter channelReciprocity is set to 'true,' the higher-layer parameter codebookType representing the codebook type within the Codebook Configuration IE must be set to 'typeII-PortSelection-r16'. A UE 205 that is configured with a Reporting Setting with the higher-layer parameter channelReciprocity set to 'true' would feed back a CSI report based on the configured higher-layer parameter paramCombination-r16 whenever the RI value v reported in Part 1 of the CSI report satisfies v≤2, whereas the UE 205 would feed back a CSI report based on the configured higher-layer parameter paramCombination1-r16 II) whenever the RI value v reported in Part 1 of the CSI report satisfies v>2, where each parameter combination would be applied to all transmission layers reported in the codebook for a given RI v.

Example 3: A new Codebook Configuration IE is introduced for Rel-17, e.g., CodebookConfig-r17, in which a new Type-II Port-Selection codebook is introduced, e.g., the higher-layer parameter codebookType is set to 'typeII-Port-Selection-r17'. The Codebook Configuration IE is associated with a single parameter combination, e.g., paramCombination1-r17, that is higher-layer configured. A UE 205 that is configured with a Rel-17 Type-II Port Selection Codebook under a Rel-17 Codebook Configuration would select either the configured parameter combination, or a fixed parameter combination that may be known to both the UE 205 and the network/RAN node 210. The UE 205 would then feed back a CSI report composed of two parts with Part 1 including an RI value of v, where a vector of v bits is reported in Part 1 of the CSI report, e.g., paramCombinationIndex that indicates the selected parameter combination out of either the network-configured parameter combination or the fixed parameter combination, where a parameter combination is selected for each transmission layer, i.e., layer-specific parameter combination selection.

Example 4: A new Codebook Configuration IE is introduced for Rel-17, e.g., CodebookConfig-r17, in which a new Type-II Port-Selection codebook is introduced, e.g., the higher-layer parameter codebookType is set to 'typeII-Port-Selection-r17'. The Codebook Configuration IE is not associated with a parameter combination. A UE 205 that is configured with a Rel-17 Type-II Port Selection Codebook under a Rel-17 Codebook Configuration would select one out of Q fixed parameter combinations that may be known to both the UE 205 and the network/RAN node 210. The UE 205 would then feed back a CSI report composed of two parts, where an indictor parameter, e.g., paramCombinationIndex, with a bitwidth of $\lceil \log_2 Q \rceil$ bits is reported in Part 1 of the CSI report, so as to indicate the selected parameter combination out of the Q fixed parameter combinations, which would be applied to all transmission layers reported in the codebook.

Regarding Antenna Panel/Port, Quasi-collocation, Transmission Configuration Indicator ("TCI") state, and Spatial Relation, in some embodiments, the terms antenna, panel, and antenna panel are used interchangeably. An antenna panel may be a hardware that is used for transmitting and/or receiving radio signals at frequencies lower than 6 GHz, e.g., frequency range #1 ("FR1"), or higher than 6 GHz, e.g., frequency range #2 ("FR2") or millimeter wave (mmWave). As used herein, FR1 refers to frequency bands from 410 MHz to 7125 MHz, FR2 refers to frequency bands from 24.25 GHz to 52.6 GHz, and mmWave refers generally to frequencies between 30 GHz and 300 GHz. In some embodiments, an antenna panel may comprise an array of antenna elements, where each antenna element is connected to hardware such as a phase shifter that allows a control module to apply spatial parameters for transmission and/or reception of signals. The resulting radiation pattern may be called a beam, which may or may not be unimodal and may allow the device to amplify signals that are transmitted or received from spatial directions.

In some embodiments, an antenna panel may or may not be virtualized as an antenna port in the specifications. An antenna panel may be connected to a baseband processing module through a radio frequency ("RF") chain for each of transmission (egress) and reception (ingress) directions. A capability of a device in terms of the number of antenna panels, their duplexing capabilities, their beamforming capabilities, and so on, may or may not be transparent to other devices. In some embodiments, capability information may be communicated via signaling or, in some embodiments, capability information may be provided to devices without a need for signaling. In the case that such information is available to other devices, it can be used for signaling or local decision making.

In some embodiments, a device (e.g., UE 205, node) antenna panel may be a physical or logical antenna array comprising a set of antenna elements or antenna ports that share a common or a significant portion of an RF chain (e.g., in-phase/quadrature ("I/Q") modulator, analog to digital ("A/D") converter, local oscillator, phase shift network). The device antenna panel or "device panel" may be a logical entity with physical device antennas mapped to the logical entity. The mapping of physical device antennas to the logical entity may be up to device implementation. Communicating (receiving or transmitting) on at least a subset of antenna elements or antenna ports active for radiating energy (also referred to herein as active elements) of an antenna panel requires biasing or powering on of the RF chain which results in current drain or power consumption in the device associated with the antenna panel (including power amplifier/low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In some embodiments, depending on device's own implementation, a "device panel" can have at least one of the following functionalities as an operational role of Unit of antenna group to control its Tx beam independently, Unit of antenna group to control its transmission power independently, Unit of antenna group to control its transmission timing independently. The "device panel" may be transparent to the RAN entity/gNB. For certain condition(s), the RAN entity or network/RAN node 210 can assume the mapping between device's physical antennas to the logical entity "device panel" may not be changed. For example, the condition may include until the next update or report from device or comprise a duration of time over which the RAN entity assumes there will be no change to the mapping. A Device may report its capability with respect to the "device panel" to the RAN entity or network/RAN node 210. The device capability may include at least the number of "device panels." In one implementation, the device may support UL transmission from one beam within a panel; with multiple panels, more than one beam (one beam per panel) may be used for UL transmission. In another implementation, more than one beam per panel may be supported/used for UL transmission.

In some of the embodiments described, an antenna port is defined such that the channel over which a symbol on the antenna port is conveyed can be inferred from the channel over which another symbol on the same antenna port is conveyed.

Two antenna ports are said to be quasi co-located ("QCL") if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters. Two antenna ports may be quasi-located with respect to a subset of the large-scale properties and different subset of large-scale properties may be indicated by a QCL Type. The QCL Type can indicate which channel properties are the same between the two reference signals (e.g., on the two antenna ports). Thus, the reference signals can be linked to each other with respect to what the UE 205 can assume about their channel statistics or QCL properties. For example, qcl-Type may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

Spatial Rx parameters may include one or more of: angle of arrival ("AoA"), Dominant AoA, average AoA, angular spread, Power Angular Spectrum ("PAS") of AoA, average angle of departure ("AoD"), PAS of AoD, transmit/receive channel correlation, transmit/receive beamforming, spatial channel correlation etc.

The QCL-TypeA, QCL-TypeB and QCL-TypeC may be applicable for all carrier frequencies, but the QCL-TypeD may be applicable only in higher carrier frequencies (e.g., mmWave, FR2 and beyond), where essentially the UE 205 may not be able to perform omni-directional transmission, i.e., the UE 205 would need to form beams for directional transmission. A QCL-TypeD between two reference signals A and B, the reference signal A is considered to be spatially co-located with reference signal B and the UE 205 may assume that the reference signals A and B can be received with the same spatial filter (e.g., with the same Receive ("Rx") beamforming weights).

An "antenna port" according to an embodiment may be a logical port that may correspond to a beam (resulting from beamforming) or may correspond to a physical antenna on a device. In some embodiments, a physical antenna may map directly to a single antenna port, in which an antenna port corresponds to an actual physical antenna. Alternately, a set or subset of physical antennas, or antenna set or antenna array or antenna sub-array, may be mapped to one or more antenna ports after applying complex weights, a cyclic delay, or both to the signal on each physical antenna. The physical antenna set may have antennas from a single module or panel or from multiple modules or panels. The weights may be fixed as in an antenna virtualization scheme, such as cyclic delay diversity ("CDD"). The procedure used to derive antenna ports from physical antennas may be specific to a device implementation and transparent to other devices.

In some of the embodiments described, a TCI-state (Transmission Configuration Indication) associated with a target transmission can indicate parameters for configuring a quasi-collocation relationship between the target transmission (e.g., target RS of Demodulation Reference Signal ("DM-RS") ports of the target transmission during a transmission occasion) and a source reference signal(s) (e.g., Synchronization Signal Block ("SSB"), Channel State Interference Reference Signal ("CSI-RS") and/or SRS) with respect to quasi co-location type parameter(s) indicated in the corresponding TCI state. The TCI describes which reference signals are used as QCL source, and what QCL properties can be derived from each reference signal. A device can receive a configuration of a plurality of transmission configuration indicator states for a serving cell for transmissions on the serving cell. In some of the embodiments described, a TCI state comprises at least one source RS to provide a reference (UE assumption) for determining QCL and/or spatial filter.

In some of the embodiments described, a spatial relation information associated with a target transmission can indicate parameters for configuring a spatial setting between the target transmission and a reference RS (e.g., SSB, CSI-RS and/or SRS). For example, the device may transmit the target transmission with the same spatial domain filter used for reception the reference RS (e.g., DL RS such as SSB and/or CSI-RS). In another example, the device may transmit the target transmission with the same spatial domain transmission filter used for the transmission of the reference RS (e.g., UL RS such as SRS). A device can receive a configuration of a plurality of spatial relation information configurations for a serving cell for transmissions on the serving cell.

FIG. 7 depicts a NR protocol stack 700, according to embodiments of the disclosure. While FIG. 7 shows the UE 205, the RAN node 210 and an AMF 705 in a 5G core network ("5GC"), these are representative of a set of remote units 105 interacting with a base unit 121 and a mobile core network 140. As depicted, the protocol stack 700 comprises a User Plane protocol stack 710 and a Control Plane protocol stack 715. The User Plane protocol stack 710 includes a physical ("PHY") layer 720, a Medium Access Control ("MAC") sublayer 725, the Radio Link Control ("RLC") sublayer 730, a Packet Data Convergence Protocol ("PDCP") sublayer 735, and Service Data Adaptation Protocol ("SDAP") layer 740. The Control Plane protocol stack 715 includes a physical layer 720, a MAC sublayer 725, a RLC sublayer 730, and a PDCP sublayer 735. The Control Plane protocol stack 715 also includes a Radio Resource Control ("RRC") layer 745 and a Non-Access Stratum ("NAS") layer 750.

The AS layer (also referred to as "AS protocol stack") for the User Plane protocol stack 710 consists of at least SDAP, PDCP, RLC and MAC sublayers, and the physical layer. The AS layer for the Control Plane protocol stack 715 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 745 and the NAS layer 750 for the control plane and includes, e.g., an Internet Protocol ("IP") layer and/or PDU Layer (not depicted) for the user plane. L1 and L2 are referred to as "lower layers," while L3 and above (e.g., transport layer, application layer) are referred to as "higher layers" or "upper layers."

The physical layer 720 offers transport channels to the MAC sublayer 725. The physical layer 720 may perform a Clear Channel Assessment and/or Listen-Before-Talk ("CCA/LBT") procedure using energy detection thresholds, as described herein. In certain embodiments, the physical layer 720 may send a notification of UL Listen-Before-Talk ("LBT") failure to a MAC entity at the MAC sublayer 725. The MAC sublayer 725 offers logical channels to the RLC sublayer 730. The RLC sublayer 730 offers RLC channels to the PDCP sublayer 735. The PDCP sublayer 735 offers radio bearers to the SDAP sublayer 740 and/or RRC layer 745. The SDAP sublayer 740 offers QoS flows to the core network (e.g., 5GC). The RRC layer 745 provides for the addition, modification, and release of Carrier Aggregation and/or Dual Connectivity. The RRC layer 745 also manages the establishment, configuration, maintenance, and release of Signaling Radio Bearers ("SRBs") and Data Radio Bearers ("DRBs").

The NAS layer 750 is between the UE 205 and the 5GC (i.e., AMF 705). NAS messages are passed transparently through the RAN. The NAS layer 750 is used to manage the establishment of communication sessions and for maintaining continuous communications with the UE 205 as it moves between different cells of the RAN. In contrast, the AS layer is between the UE 205 and the RAN (i.e., RAN node 210) and carries information over the wireless portion of the network.

Figure 8:
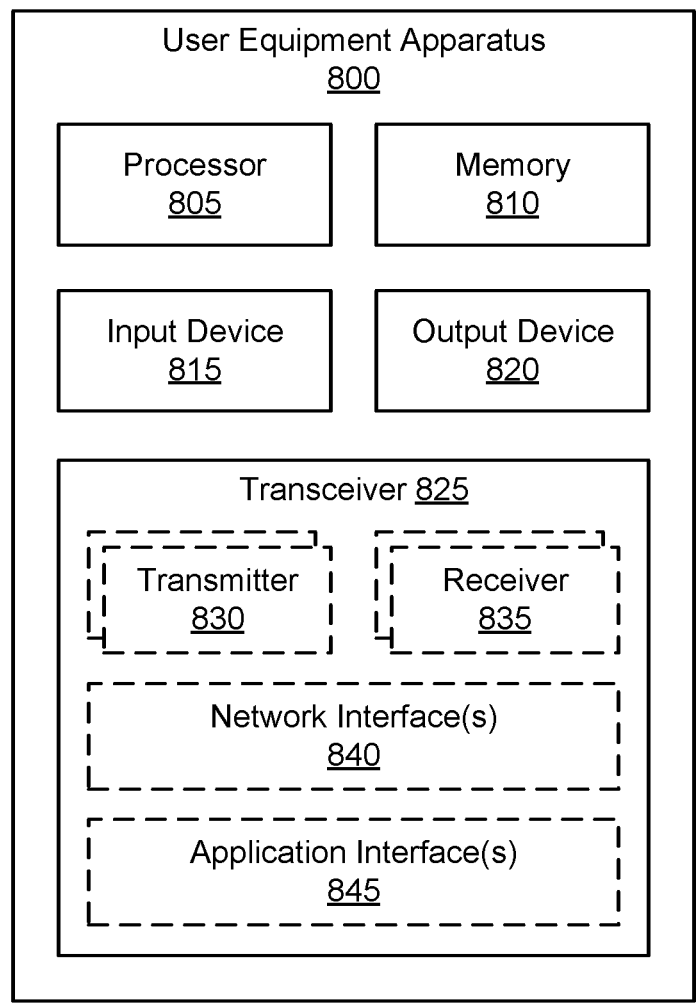
FIG. 8 is a block diagram illustrating one embodiment of a user equipment apparatus that may be used for reporting a UE-selected parameter combination for reciprocity-based Type-II CSI codebook.

FIG. 8 depicts a user equipment apparatus 800 that may be used for reporting a UE-selected parameter combination for reciprocity-based Type-II CSI codebook, according to embodiments of the disclosure. In various embodiments, the user equipment apparatus 800 is used to implement one or more of the solutions described above. The user equipment apparatus 800 may be one embodiment of the remote unit 105 and/or the UE 205, described above. Furthermore, the user equipment apparatus 800 may include a processor 805, a memory 810, an input device 815, an output device 820, and a transceiver 825.

In some embodiments, the input device 815 and the output device 820 are combined into a single device, such as a touchscreen. In certain embodiments, the user equipment apparatus 800 may not include any input device 815 and/or output device 820. In various embodiments, the user equipment apparatus 800 may include one or more of: the processor 805, the memory 810, and the transceiver 825, and may not include the input device 815 and/or the output device 820.

As depicted, the transceiver 825 includes at least one transmitter 830 and at least one receiver 835. In some embodiments, the transceiver 825 communicates with one or more cells (or wireless coverage areas) supported by one or more base units 121. In various embodiments, the transceiver 825 is operable on unlicensed spectrum. Moreover, the transceiver 825 may include multiple UE panels supporting one or more beams. Additionally, the transceiver 825 may support at least one network interface 840 and/or application interface 845. The application interface(s) 845 may support one or more APIs. The network interface(s) 840 may support 3GPP reference points, such as Uu, N1, PC5, etc. Other network interfaces 840 may be supported, as understood by one of ordinary skill in the art.

The processor 805, in one embodiment, may include any known controller capable of executing computer-readable instructions and/or capable of performing logical operations. For example, the processor 805 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825.

In various embodiments, the processor 805 controls the user equipment apparatus 800 to implement the above described UE behaviors. In certain embodiments, the processor 805 may include an application processor (also known as "main processor") which manages application-domain and operating system ("OS") functions and a baseband processor (also known as "baseband radio processor") which manages radio functions.

In various embodiments, the processor 805 receives (i.e., via the transceiver 825) a CSI reporting configuration from the RAN of a mobile communication network, said reporting configuration containing a codebook configuration and receives a set of CSI reference signals. In various embodiments, the processor 805 receives one or more CSI-Report-Config Reporting Settings, where each Reporting Setting may configure at least one CodebookConfig Codebook Configuration and/or one reportQuantity Reporting Quantity.

The processor 805 identifies a set of antenna ports based on the set of CSI reference signals and generates at least one coefficient amplitude indicator and one coefficient phase indicator for each antenna port in the identified set of antenna ports, e.g., the pair ($a_i$, $p_i$) represent amplitude and phase values of coefficient i. The processor 805 selects a subset of at least one parameter combination from a set of two or more parameter combinations corresponding to the codebook configuration and sends a CSI report to the RAN, the CSI report indicating the selected parameter combination. The CSI report includes a rank indicator that indicates an amount of transmission layers (e.g., the number of data streams) and the generated at least one amplitude and phase coefficient indicator.

In some embodiments, generating the at least one coefficient amplitude indicator and coefficient phase indicator for each antenna port is based on at least one of: A) the received beamformed reference signals, B) CSI reporting configuration information received in Downlink Control Information ("DCI") (i.e., including a number of beams), and C) the codebook configuration information.

In some embodiments, each parameter combination includes a subset of indicators indicating: A) an amount/quantity (i.e., total number) of non-zero amplitude coefficients, B) an amount/quantity (i.e., total number) of Frequency Domain ("FD") basis indices, C) an amount/quantity (i.e., total number) of beams per transmission layer, and D) an amount/quantity (i.e., total number) of Precoding Matrix Indicator ("PMI") sub-bands per Channel Quality Indicator ("CQI") sub-band.

In some embodiments, the codebook configuration is based on a port-selection codebook, where the port-selection codebook is configured as a codebook sub-type of a Type-II CSI codebook. In some embodiments, the set of two or more parameter combinations consists of two parameter combinations, where each parameter combination is indicated within the CSI reporting configuration (i.e., either within or separate from the codebook configuration).

In some embodiments, the set of two or more parameter combinations consists of two parameter combinations, where a first of the two parameter combinations is indicated by the CSI reporting configuration. In such embodiments, the second of the two parameter combinations is implied from the indicated first parameter combination. In one embodiment, the second parameter combination includes half of the values of beams of the first parameter combination.

For example, the second parameter combination may be set by a rule, where the RAN reports (as the first parameter combination) a parameter combination of [L, K]=[4,20], where L represents the number of beams and K represents the number of coefficients. Here, based on a rule that is indicated in the specification, the processor 805 understands that the second parameter combination includes half of the values of beams of the first parameter combination. Accordingly, the processor 805 may either select the indicated (first) parameter combination (i.e., [L, K]=[4, 20]) or select the (implicit) second combination with half the values, e.g., [L, K] [2, 10].

In some embodiments, the transceiver 825 communicates with the RAN using multiple transmission layers (e.g., data streams). In such embodiments, the CSI report corresponds to multiple transmission layers, where the selected subset of at least one parameter combination contains one parameter combination assigned for each transmission layer (or assigned per group of transmission layers). In some embodiments, the selected subset of at least one parameter combination contains one parameter combination assigned for each beam (i.e., for polarization-agnostic beams) or assigned per polarization for each beam.

In some embodiments, the selected subset of at least one parameter combination consists of two parameter combinations, where a first of the two parameter combinations is assigned to one or more transmission layers based on a first set of layer indices and where a second of the two parameter combinations is assigned to one or more transmission layers based on a second set of layer indices. For example, the UE selection may be based on layer index ("LI"), and hence two combinations can apply.

In some embodiments, the selected subset of at least one parameter combination consists of two parameter combinations, where a first of the two parameter combinations is assigned to one or more transmission layers based on a first set of rank indices and where a second of the two parameter combinations is assigned to one or more transmission layers based on a second set of rank indices. For example, the UE selection may be based on rank, and hence one combination applies to all layers.

In some embodiments, the selected subset of at least one parameter combination consists of two parameter combinations, and where a first of the two parameter combinations is assigned to one or more beams based on a first set of beam indices, and where a second of the two parameter combinations are assigned to one or more beams based on a second set of beam indices. For example, the UE selection may be based on beam index, and hence two combinations can apply.

In some embodiments, the selected subset of at least one parameter combination consists of a single parameter combination. In some embodiments, an indication of the selected subset of at least one parameter combination is fed back in one part of the CSI report.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to reporting a UE-selected parameter combination for reciprocity-based Type-II CSI codebook and/or mobile operation. For example, the memory 810 may store various parameters, panel/beam configurations, resource assignments, policies, and the like as described above. In certain embodiments, the memory 810 also stores program code and related data, such as an operating system or other controller algorithms operating on the apparatus 800.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 820 may include a wearable display separate from, but communicatively coupled to, the rest of the user equipment apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, the output device 820 may be located near the input device 815.

The transceiver 825 communicates with one or more network functions of a mobile communication network via one or more access networks. The transceiver 825 operates under the control of the processor 805 to transmit messages, data, and other signals and also to receive messages, data, and other signals. For example, the processor 805 may selectively activate the transceiver 825 (or portions thereof) at particular times in order to send and receive messages.

The transceiver 825 includes at least transmitter 830 and at least one receiver 835. One or more transmitters 830 may be used to provide UL communication signals to a base unit 121, such as the UL transmissions described herein. Similarly, one or more receivers 835 may be used to receive DL communication signals from the base unit 121, as described herein. Although only one transmitter 830 and one receiver 835 are illustrated, the user equipment apparatus 800 may have any suitable number of transmitters 830 and receivers 835. Further, the transmitter(s) 830 and the receiver(s) 835 may be any suitable type of transmitters and receivers. In one embodiment, the transceiver 825 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 825, transmitters 830, and receivers 835 may be implemented as physically separate components that access a shared hardware resource and/or software resource, such as for example, the network interface 840.

In various embodiments, one or more transmitters 830 and/or one or more receivers 835 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 830 and/or one or more receivers 835 may be implemented and/or integrated into a multi-chip module. In some embodiments, other components such as the network interface 840 or other hardware components/circuits may be integrated with any number of transmitters 830 and/or receivers 835 into a single chip. In such embodiment, the transmitters 830 and receivers 835 may be logically configured as a transceiver 825 that uses one more common control signals or as modular transmitters 830 and receivers 835 implemented in the same hardware chip or in a multi-chip module.

Figure 9:
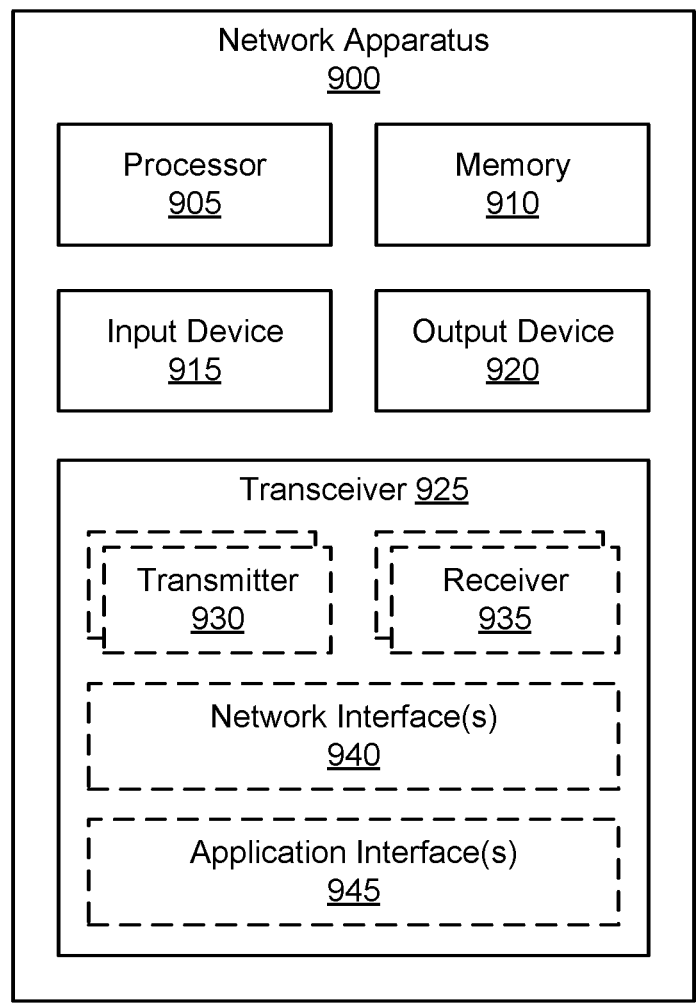
FIG. 9 is a block diagram illustrating one embodiment of a network apparatus that may be used for reporting a UE-selected parameter combination for reciprocity-based Type-II CSI codebook.

FIG. 9 depicts a network apparatus 900 that may be used for reporting a UE-selected parameter combination for reciprocity-based Type-II CSI codebook, according to embodiments of the disclosure. In one embodiment, network apparatus 900 may be one implementation of device in a mobile communication network, such as the base unit 121 and/or the RAN node 210, as described above. Furthermore, the network apparatus 900 may include a processor 905, a memory 910, an input device 915, an output device 920, and a transceiver 925.

In some embodiments, the input device 915 and the output device 920 are combined into a single device, such as a touchscreen. In certain embodiments, the network apparatus 900 may not include any input device 915 and/or output device 920. In various embodiments, the network apparatus 900 may include one or more of: the processor 905, the memory 910, and the transceiver 925, and may not include the input device 915 and/or the output device 920.

As depicted, the transceiver 925 includes at least one transmitter 930 and at least one receiver 935. Here, the transceiver 925 communicates with one or more remote units 105. Additionally, the transceiver 925 may support at least one network interface 940 and/or application interface 945. The application interface(s) 945 may support one or more APIs. The network interface(s) 940 may support 3GPP reference points, such as Uu, N1, N2 and N3. Other network interfaces 940 may be supported, as understood by one of ordinary skill in the art.

The processor 905, in one embodiment, may include any known controller capable of executing computer-readable instructions and/or capable of performing logical operations. For example, the processor 905 may be a microcontroller, a microprocessor, a CPU, a GPU, an auxiliary processing unit, a FPGA, or similar programmable controller. In some embodiments, the processor 905 executes instructions stored in the memory 910 to perform the methods and routines described herein. The processor 905 is communicatively coupled to the memory 910, the input device 915, the output device 920, and the transceiver 925.

In various embodiments, the network apparatus 900 is a RAN node (e.g., gNB) that communicates with one or more UEs, as described herein. In such embodiments, the processor 905 controls the network apparatus 900 to perform the above described RAN behaviors. When operating as a RAN node, the processor 905 may include an application processor (also known as "main processor") which manages application-domain and operating system ("OS") functions and a baseband processor (also known as "baseband radio processor") which manages radio functions.

In various embodiments, the processor 905 controls the transceiver 925 to send to a UE a CSI reporting configuration to a UE, said CSI reporting configuration containing a codebook configuration. In various embodiments, each UE receives one or more CSI-ReportConfig Reporting Settings, where each Reporting Setting may configure at least one CodebookConfig Codebook Configuration and/or one reportQuantity Reporting Quantity.

The processor 905 controls the transceiver to transmit a set of CSI reference signals towards the UE and receive a CSI report from the UE, said CSI report indicating a selected subset of at least one parameter combination from a set of two or more parameter combinations corresponding to the codebook configuration. Additionally, the CSI report includes a rank indicator that indicates the quantity of transmission layers (e.g., data streams) and at least one coefficient amplitude indicator and at least one coefficient phase indicator for each antenna port in a set of antenna ports identified by the UE, e.g., the pair ($a_i$, $p_i$) represent amplitude and phase values of coefficient i.

In some embodiments, each parameter combination includes a subset of indicators indicating: A) an amount/quantity (i.e., total number) of non-zero amplitude coefficients, B) an amount/quantity (i.e., total number) of FD basis indices, C) an amount/quantity (i.e., total number) of beams per transmission layer, and D) an amount/quantity (i.e., total number) of PMI sub-bands per CQI sub-band.

In some embodiments, the codebook configuration is based on a port-selection codebook, where the port-selection codebook is configured as a codebook sub-type of a Type-II CSI codebook. In some embodiments, the set of two or more parameter combinations includes two parameter combinations, where each parameter combination is indicated within the CSI reporting configuration (i.e., either within or separate from the codebook configuration).

In some embodiments, the set of two or more parameter combinations includes two parameter combinations, where a first of the two parameter combinations is indicated by the CSI reporting configuration. In such embodiments, the second of the two parameter combinations is implied from the indicated first parameter combination. In one embodiment, the second parameter combination includes half of the values of beams of the first parameter combination.

In some embodiments, the transceiver 925 communicates with the UE using multiple transmission layers (e.g., data streams). In such embodiments, the CSI report corresponds to multiple transmission layers, where the selected subset of at least one parameter combination contains one parameter combination assigned for each transmission layer (or assigned per group of transmission layers). In some embodiments, the selected subset of at least one parameter combination contains one parameter combination assigned for each beam (i.e., for polarization-agnostic beams) or assigned per polarization for each beam.

In some embodiments, the selected subset of at least one parameter combination includes two parameter combinations, where a first of the two parameter combinations is assigned to one or more transmission layers based on a first set of layer indices and where a second of the two parameter combinations is assigned to one or more transmission layers based on a second set of layer indices. For example, the UE selection may be based on LI, and hence two combinations can apply.

In some embodiments, the selected subset of at least one parameter combination includes two parameter combinations, where a first of the two parameter combinations is assigned to one or more transmission layers based on a first set of rank indices and where a second of the two parameter combinations is assigned to one or more transmission layers based on a second set of rank indices. For example, the UE selection may be based on rank, and hence one combination applies to all layers.

In some embodiments, the selected subset of at least one parameter combination includes two parameter combinations, and where a first of the two parameter combinations is assigned to one or more beams based on a first set of beam indices, and where a second of the two parameter combinations are assigned to one or more beams based on a second set of beam indices. For example, the UE selection may be based on beam index, and hence two combinations can apply.

In some embodiments, the selected subset of at least one parameter combination contains a single parameter combination. In some embodiments, an indication of the selected subset of at least one parameter combination is fed back in one part of the CSI report.

The memory 910, in one embodiment, is a computer readable storage medium. In some embodiments, the memory 910 includes volatile computer storage media. For example, the memory 910 may include a RAM, including dynamic RAM ("DRAM"), synchronous dynamic RAM ("SDRAM"), and/or static RAM ("SRAM"). In some embodiments, the memory 910 includes non-volatile computer storage media. For example, the memory 910 may include a hard disk drive, a flash memory, or any other suitable non-volatile computer storage device. In some embodiments, the memory 910 includes both volatile and non-volatile computer storage media.

In some embodiments, the memory 910 stores data related to reporting a UE-selected parameter combination for reciprocity-based Type-II CSI codebook. For example, the memory 910 may store parameters, configurations, resource assignments, policies, and the like, as described above. In certain embodiments, the memory 910 also stores program code and related data, such as an operating system or other controller algorithms operating on the apparatus 900.

The input device 915, in one embodiment, may include any known computer input device including a touch panel, a button, a keyboard, a stylus, a microphone, or the like. In some embodiments, the input device 915 may be integrated with the output device 920, for example, as a touchscreen or similar touch-sensitive display. In some embodiments, the input device 915 includes a touchscreen such that text may be input using a virtual keyboard displayed on the touchscreen and/or by handwriting on the touchscreen. In some embodiments, the input device 915 includes two or more different devices, such as a keyboard and a touch panel.

The output device 920, in one embodiment, is designed to output visual, audible, and/or haptic signals. In some embodiments, the output device 920 includes an electronically controllable display or display device capable of outputting visual data to a user. For example, the output device 920 may include, but is not limited to, an LCD display, an LED display, an OLED display, a projector, or similar display device capable of outputting images, text, or the like to a user. As another, non-limiting, example, the output device 920 may include a wearable display separate from, but communicatively coupled to, the rest of the network apparatus 900, such as a smart watch, smart glasses, a heads-up display, or the like. Further, the output device 920 may be a component of a smart phone, a personal digital assistant, a television, a table computer, a notebook (laptop) computer, a personal computer, a vehicle dashboard, or the like.

In certain embodiments, the output device 920 includes one or more speakers for producing sound. For example, the output device 920 may produce an audible alert or notification (e.g., a beep or chime). In some embodiments, the output device 920 includes one or more haptic devices for producing vibrations, motion, or other haptic feedback. In some embodiments, all or portions of the output device 920 may be integrated with the input device 915. For example, the input device 915 and output device 920 may form a touchscreen or similar touch-sensitive display. In other embodiments, the output device 920 may be located near the input device 915.

The transceiver 925 includes at least transmitter 930 and at least one receiver 935. One or more transmitters 930 may be used to communicate with the UE, as described herein. Similarly, one or more receivers 935 may be used to communicate with network functions in the PLMN and/or RAN, as described herein. Although only one transmitter 930 and one receiver 935 are illustrated, the network apparatus 900 may have any suitable number of transmitters 930 and receivers 935. Further, the transmitter(s) 930 and the receiver(s) 935 may be any suitable type of transmitters and receivers.

Figure 10:
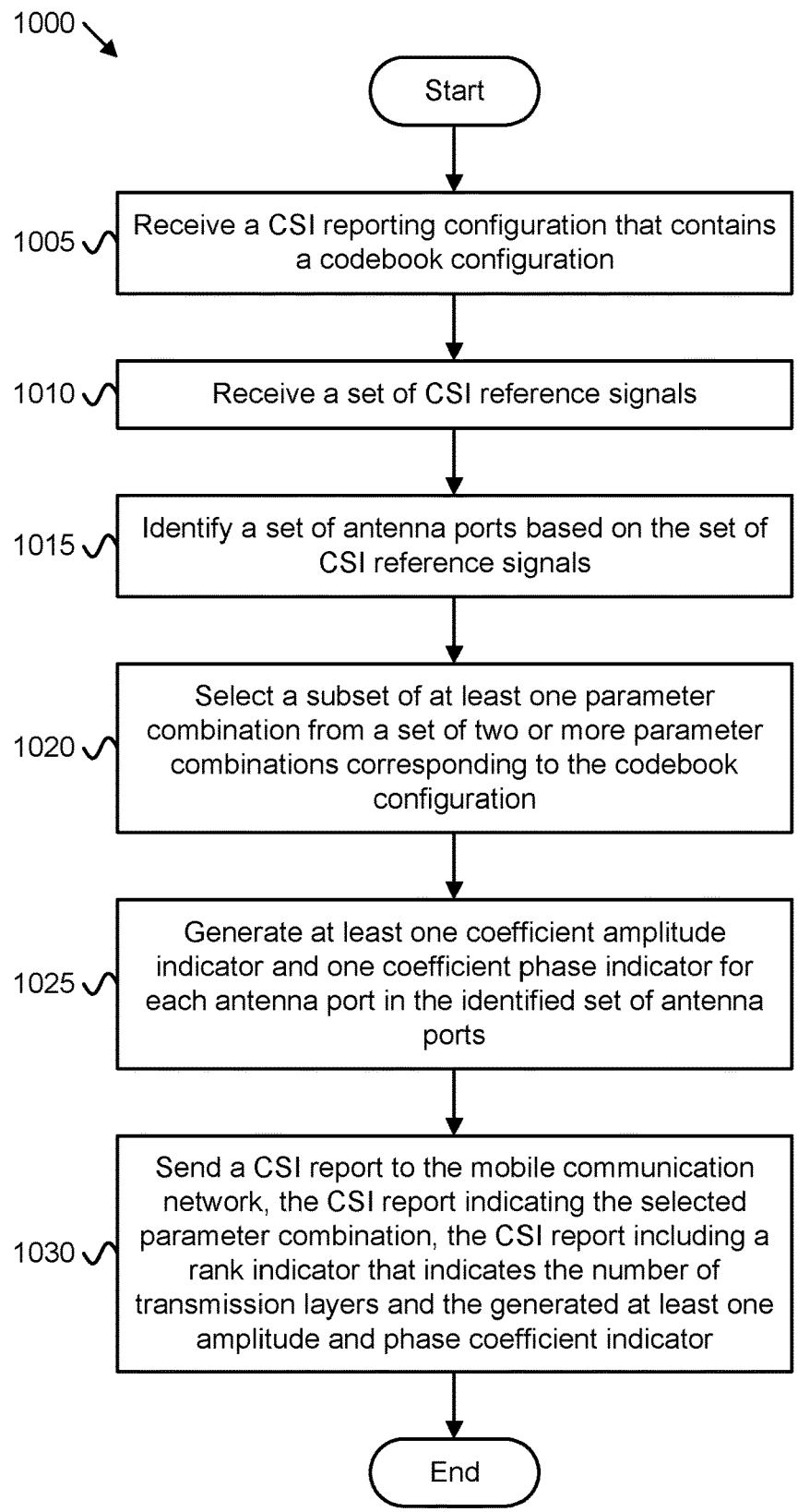
FIG. 10 is a flowchart diagram illustrating one embodiment of a first method for reporting a UE-selected parameter combination for reciprocity-based Type-II CSI codebook.

FIG. 10 depicts one embodiment of a method 1000 for reporting a UE-selected parameter combination for reciprocity-based Type-II CSI codebook, according to embodiments of the disclosure. In various embodiments, the method 1000 is performed by a user equipment device, such as the remote unit 105, the UE 205, and/or the user equipment apparatus 800, as described above. In some embodiments, the method 1000 is performed by a processor, such as a microcontroller, a microprocessor, a CPU, a GPU, an auxiliary processing unit, a FPGA, or the like.

The method 1000 begins and receives 1005, from a mobile communication network, a CSI reporting configuration that contains a codebook configuration. The method 1000 includes receiving 1010 a set of CSI reference signals. The method 1000 includes identifying 1015 a set of antenna ports based on the set of CSI reference signals. The method 1000 includes selecting 1020 a subset of at least one parameter combination from a set of two or more parameter combinations corresponding to the codebook configuration. The method 1000 includes generating 1025 at least one coefficient amplitude indicator and one coefficient phase indicator for each antenna port in the identified set of antenna ports. The method 1000 includes sending 1030 a CSI report to the mobile communication network, the CSI report indicating the selected parameter combination, the CSI report including a rank indicator that indicates the number of transmission layers (e.g., data streams) and the generated at least one amplitude and phase coefficient indicator. The method 1000 ends.

Figure 11:
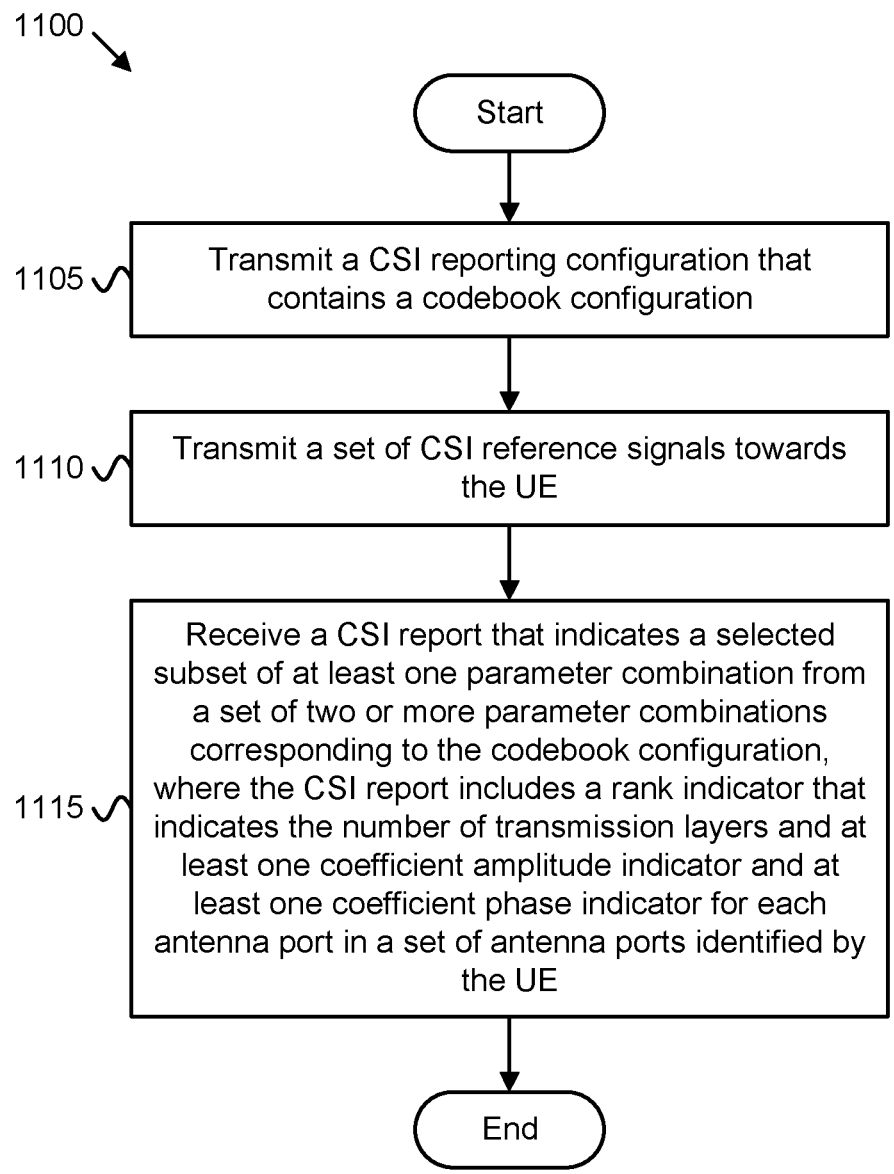
FIG. 11 is a flowchart diagram illustrating one embodiment of a second method for reporting a UE-selected parameter combination for reciprocity-based Type-II CSI codebook.

FIG. 11 depicts one embodiment of a method 1100 for reporting a UE-selected parameter combination for reciprocity-based Type-II CSI codebook, according to embodiments of the disclosure. In various embodiments, the method 1100 is performed by a RAN device, such as the base unit 121, the RAN node 210 and/or the network apparatus 900, as described above. In some embodiments, the method 1100 is performed by a processor, such as a microcontroller, a microprocessor, a CPU, a GPU, an auxiliary processing unit, a FPGA, or the like.

The method 1100 begins and transmits 1105, to a UE, a CSI reporting configuration that contains a codebook configuration. The method 1100 includes transmitting 1110 a set of CSI reference signals towards the UE. The method 1100 includes receiving 1115, from the UE, a CSI report that indicates a selected subset of at least one parameter combination from a set of two or more parameter combinations corresponding to the codebook configuration. Additionally, the CSI report includes a rank indicator that indicates the number of transmission layers and at least one coefficient amplitude indicator and at least one coefficient phase indicator for each antenna port in a set of antenna ports identified by the UE. The method 1100 ends.

Disclosed herein is a first apparatus for reporting a UE-selected parameter combination for reciprocity-based Type-II CSI codebook, according to embodiments of the disclosure. The first apparatus may be implemented by a UE device, such as the remote unit 105, the UE 205, and/or the user equipment apparatus 800, described above. The first apparatus includes a processor and a transceiver (i.e., implementing a radio interface) that receives a CSI reporting configuration from a mobile communication network, said reporting configuration containing a codebook configuration and receives a set of CSI reference signals. The processor identifies a set of antenna ports based on the set of CSI reference signals and generates at least one coefficient amplitude indicator and one coefficient phase indicator for each antenna port in the identified set of antenna ports. The processor selects a subset of at least one parameter combination from a set of two or more parameter combinations corresponding to the codebook configuration and sends a CSI report to the mobile communication network, the CSI report indicating the selected parameter combination. The CSI report includes a rank indicator that indicates the quantity of transmission layers and the generated at least one amplitude and phase coefficient indicator.

In some embodiments, generating the at least one coefficient amplitude indicator and coefficient phase indicator for each antenna port is based on at least one of: A) the received beamformed reference signals, B) CSI reporting configuration information received in DCI (i.e., including a number of beams), and C) the codebook configuration information.

In some embodiments, each parameter combination includes a subset of indicators indicating: A) a number (i.e., total number) of non-zero amplitude coefficients, B) a number (i.e., total number) of FD basis indices, C) a number (i.e., total number) of beams per transmission layer, and D) a number (i.e., total number) of PMI sub-bands per QCI sub-band.

In some embodiments, the codebook configuration is based on a port-selection codebook, where the port-selection codebook is configured as a codebook sub-type of a Type-II CSI codebook. In some embodiments, the set of two or more parameter combinations includes two parameter combinations, where each parameter combination is indicated within the CSI reporting configuration (i.e., either within or separate from the codebook configuration).

In some embodiments, the set of two or more parameter combinations includes two parameter combinations, where a first of the two parameter combinations is indicated by the CSI reporting configuration. In such embodiments, the second of the two parameter combinations is implied from the indicated first parameter combination. In one embodiment, the second parameter combination includes half of the values of beams of the first parameter combination.

In some embodiments, the CSI report corresponds to multiple transmission layers, where the selected subset of at least one parameter combination contains one parameter combination assigned for each transmission layer (or assigned per group of transmission layers). In some embodiments, the selected subset of at least one parameter combination contains one parameter combination assigned for each beam (i.e., for polarization-agnostic beams) or assigned per polarization for each beam.

In some embodiments, the selected subset of at least one parameter combination includes two parameter combinations, where a first of the two parameter combinations is assigned to one or more transmission layers based on a first set of layer indices and where a second of the two parameter combinations is assigned to one or more transmission layers based on a second set of layer indices.

In some embodiments, the selected subset of at least one parameter combination includes two parameter combinations, where a first of the two parameter combinations is assigned to one or more transmission layers based on a first set of rank indices and where a second of the two parameter combinations is assigned to one or more transmission layers based on a second set of rank indices.

In some embodiments, the selected subset of at least one parameter combination includes two parameter combinations, where a first of the two parameter combinations is assigned to one or more beams based on a first set of beam indices, and where a second of the two parameter combinations are assigned to one or more beams based on a second set of beam indices.

In some embodiments, the selected subset of at least one parameter combination contains a single parameter combination. In some embodiments, an indication of the selected subset of at least one parameter combination is fed back in one part of the CSI report.

Disclosed herein is a first method for reporting a UE-selected parameter combination for reciprocity-based Type-II CSI codebook, according to embodiments of the disclosure. The first method may be performed by a UE device, such as the remote unit 105, the UE 205, and/or the user equipment apparatus 800, described above. The first method includes receiving a CSI reporting configuration from a mobile communication network, said reporting configuration containing a codebook configuration. The first method includes receiving a set of CSI reference signals and identifying a set of antenna ports based on the set of CSI reference signals. The first method includes selecting a subset of at least one parameter combination from a set of two or more parameter combinations corresponding to the codebook configuration and generating at least one coefficient amplitude indicator and one coefficient phase indicator for each antenna port in the identified set of antenna ports. The first method includes sending a CSI report to the mobile communication network, the CSI report indicating the selected parameter combination, the CSI report including a rank indicator that indicates the quantity of transmission layers (e.g., data streams) and the generated at least one amplitude and phase coefficient indicator.

In some embodiments, generating the at least one coefficient amplitude indicator and coefficient phase indicator for each antenna port is based on at least one of: A) the received beamformed reference signals, B) CSI reporting configuration information received in DCI (i.e., including a number of beams), and C) the codebook configuration information.

In some embodiments, each parameter combination includes a subset of indicators indicating: A) a number (i.e., total number) of non-zero amplitude coefficients, B) a number (i.e., total number) of FD basis indices, C) a number (i.e., total number) of beams per transmission layer, and D) a number (i.e., total number) of PMI sub-bands per CQI sub-band.

In some embodiments, the codebook configuration is based on a port-selection codebook, where the port-selection codebook is configured as a codebook sub-type of a Type-II CSI codebook. In some embodiments, the set of two or more parameter combinations includes two parameter combinations, where each parameter combination is indicated within the CSI reporting configuration (i.e., either within or separate from the codebook configuration).

In some embodiments, the set of two or more parameter combinations includes two parameter combinations, where a first of the two parameter combinations is indicated by the CSI reporting configuration. In such embodiments, the second of the two parameter combinations is implied from the indicated first parameter combination. In one embodiment, the second parameter combination includes half of the values of beams of the first parameter combination.

In some embodiments, the CSI report corresponds to multiple transmission layers, where the selected subset of at least one parameter combination contains one parameter combination assigned for each transmission layer (or assigned per group of transmission layers). In some embodiments, the selected subset of at least one parameter combination contains one parameter combination assigned for each beam (i.e., for polarization-agnostic beams) or assigned per polarization for each beam.

In some embodiments, the selected subset of at least one parameter combination includes two parameter combinations, where a first of the two parameter combinations is assigned to one or more transmission layers based on a first set of layer indices and where a second of the two parameter combinations is assigned to one or more transmission layers based on a second set of layer indices.

In some embodiments, the selected subset of at least one parameter combination includes two parameter combinations, where a first of the two parameter combinations is assigned to one or more transmission layers based on a first set of rank indices and where a second of the two parameter combinations is assigned to one or more transmission layers based on a second set of rank indices.

In some embodiments, the selected subset of at least one parameter combination includes two parameter combinations, where a first of the two parameter combinations is assigned to one or more beams based on a first set of beam indices, and where a second of the two parameter combinations are assigned to one or more beams based on a second set of beam indices.

In some embodiments, the selected subset of at least one parameter combination contains a single parameter combination. In some embodiments, an indication of the selected subset of at least one parameter combination is fed back in one part of the CSI report.

Disclosed herein is a second apparatus for reporting a UE-selected parameter combination for reciprocity-based Type-II CSI codebook, according to embodiments of the disclosure. The second apparatus may be implemented by a device in a radio access network ("RAN"), such as the base unit 121, the RAN node 210, and/or the network apparatus 900, described above. The second apparatus includes a processor and a transceiver (i.e., implementing a radio interface) that transmits a CSI reporting configuration to a UE in a mobile communication network, said CSI reporting configuration containing a codebook configuration. The processor controls the transceiver to transmit a set of CSI reference signals towards the UE and receive a CSI report from the UE, said CSI report indicating a selected subset of at least one parameter combination from a set of two or more parameter combinations corresponding to the codebook configuration. Additionally, the CSI report includes a rank indicator that indicates the number of transmission layers (e.g., data streams) and at least one coefficient amplitude indicator and at least one coefficient phase indicator for each antenna port in a set of antenna ports identified by the UE.

In some embodiments, each parameter combination includes a subset of indicators indicating: A) a number (i.e., total number) of non-zero amplitude coefficients, B) a number (i.e., total number) of FD basis indices, C) a number (i.e., total number) of beams per transmission layer, and D) a number (i.e., total number) of PMI sub-bands per CQI sub-band.

In some embodiments, the codebook configuration is based on a port-selection codebook, where the port-selection codebook is configured as a codebook sub-type of a Type-II CSI codebook. In some embodiments, the set of two or more parameter combinations includes two parameter combinations, where each parameter combination is indicated within the CSI reporting configuration (i.e., either within or separate from the codebook configuration).

In some embodiments, the set of two or more parameter combinations includes two parameter combinations, where a first of the two parameter combinations is indicated by the CSI reporting configuration. In such embodiments, the second of the two parameter combinations is implied from the indicated first parameter combination. In one embodiment, the second parameter combination includes half of the values of beams of the first parameter combination.

In some embodiments, the CSI report corresponds to multiple transmission layers, where the selected subset of at least one parameter combination contains one parameter combination assigned for each transmission layer (or assigned per group of transmission layers). In some embodiments, the selected subset of at least one parameter combination contains one parameter combination assigned for each beam (i.e., for polarization-agnostic beams) or assigned per polarization for each beam.

In some embodiments, the selected subset of at least one parameter combination includes two parameter combinations, where a first of the two parameter combinations is assigned to one or more transmission layers based on a first set of layer indices and where a second of the two parameter combinations is assigned to one or more transmission layers based on a second set of layer indices.

In some embodiments, the selected subset of at least one parameter combination includes two parameter combinations, where a first of the two parameter combinations is assigned to one or more transmission layers based on a first set of rank indices and where a second of the two parameter combinations is assigned to one or more transmission layers based on a second set of rank indices.

In some embodiments, the selected subset of at least one parameter combination includes two parameter combinations, where a first of the two parameter combinations is assigned to one or more beams based on a first set of beam indices, and where a second of the two parameter combinations are assigned to one or more beams based on a second set of beam indices.

In some embodiments, the selected subset of at least one parameter combination contains a single parameter combination. In some embodiments, an indication of the selected subset of at least one parameter combination is fed back in one part of the CSI report.

Disclosed herein is a second method for reporting a UE-selected parameter combination for reciprocity-based Type-II CSI codebook, according to embodiments of the disclosure. The second method may be performed by a device in a RAN, such as the base unit 121, the RAN node 210 and/or the network apparatus 900, described above. The second method includes transmitting a CSI reporting configuration to a UE in a mobile communication network, said CSI reporting configuration containing a codebook configuration. The second method includes transmitting a set of CSI reference signals towards the UE and receiving a CSI report from the UE, said CSI report indicating a selected subset of at least one parameter combination from a set of two or more parameter combinations corresponding to the codebook configuration. Additionally, the CSI report includes a rank indicator that indicates the number of transmission layers (e.g., data streams) and at least one coefficient amplitude indicator and at least one coefficient phase indicator for each antenna port in a set of antenna ports identified by the UE.

In some embodiments, generating the at least one coefficient amplitude indicator and coefficient phase indicator for each antenna port is based on at least one of: A) the received beamformed reference signals, B) CSI reporting configuration information received in DCI (i.e., including a number of beams), and C) the codebook configuration information.

In some embodiments, each parameter combination includes a subset of indicators indicating: A) a number (i.e., total number) of non-zero amplitude coefficients, B) a number (i.e., total number) of FD basis indices, C) a number (i.e., total number) of beams per transmission layer, and D) a number (i.e., total number) of PMI sub-bands per CQI sub-band.

In some embodiments, the codebook configuration is based on a port-selection codebook, where the port-selection codebook is configured as a codebook sub-type of a Type-II CSI codebook. In some embodiments, the set of two or more parameter combinations includes two parameter combinations, where each parameter combination is indicated within the CSI reporting configuration (i.e., either within or separate from the codebook configuration).

In some embodiments, the set of two or more parameter combinations includes two parameter combinations, where a first of the two parameter combinations is indicated by the CSI reporting configuration. In such embodiments, the second of the two parameter combinations is implied from the indicated first parameter combination. In one embodiment, the second parameter combination includes half of the values of beams of the first parameter combination.

In some embodiments, the CSI report corresponds to multiple transmission layers, where the selected subset of at least one parameter combination contains one parameter combination assigned for each transmission layer (or assigned per group of transmission layers). In some embodiments, the selected subset of at least one parameter combination contains one parameter combination assigned for each beam (i.e., for polarization-agnostic beams) or assigned per polarization for each beam.

In some embodiments, the selected subset of at least one parameter combination includes two parameter combinations, where a first of the two parameter combinations is assigned to one or more transmission layers based on a first set of layer indices and where a second of the two parameter combinations is assigned to one or more transmission layers based on a second set of layer indices.

In some embodiments, the selected subset of at least one parameter combination includes two parameter combinations, where a first of the two parameter combinations is assigned to one or more transmission layers based on a first set of rank indices and where a second of the two parameter combinations is assigned to one or more transmission layers based on a second set of rank indices.

In some embodiments, the selected subset of at least one parameter combination includes two parameter combinations, where a first of the two parameter combinations is assigned to one or more beams based on a first set of beam indices, and where a second of the two parameter combinations are assigned to one or more beams based on a second set of beam indices.

In some embodiments, the selected subset of at least one parameter combination contains a single parameter combination. In some embodiments, an indication of the selected subset of at least one parameter combination is fed back in one part of the CSI report.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a User Equipment ("UE"), the method comprising:
   receiving a Channel State Information ("CSI") reporting configuration from a mobile communication network, the CSI reporting configuration comprising a codebook configuration, and
   receiving a set of CSI reference signals;
   identifying a set of antenna ports based on the set of CSI reference signals;
   selecting a subset of at least one parameter combination from a set of two or more parameter combinations corresponding to the codebook configuration; and
   generating at least one coefficient amplitude indicator and one coefficient phase indicator for each antenna port in the identified set of antenna ports; and
   sending a CSI report to the mobile communication network, the CSI report indicating the selected parameter combination, the CSI report comprising a rank indicator that indicates a number of transmission layers and the generated at least one coefficient amplitude and the coefficient phase indicator.

2. The method of claim 1, wherein the codebook configuration is based on a port-selection codebook, wherein the port-selection codebook is configured as a codebook sub-type of a Type-II CSI codebook.

3. The method of claim 1, wherein generating the at least one coefficient amplitude indicator and coefficient phase indicator for each antenna port is based on at least one of:
   the received set of CSI reference signals,
   CSI reporting configuration information received in Downlink Control Information ("DCI"), and
   the codebook configuration.

4. The method of claim 1, wherein each parameter combination comprises a subset of indicators indicating:
   a total number of non-zero amplitude coefficients,
   a number of Frequency Domain ("FD") basis indices,
   a number of beams per transmission layer, and
   a number of Precoding Matrix Indicator ("PMI") sub-bands per Channel Quality Indicator ("CQI") sub-band.

5. The method of claim 1, wherein the set of two or more parameter combinations comprises two parameter combinations, and wherein each parameter combination is indicated within the CSI reporting configuration.

6. The method of claim 1, wherein the set of two or more parameter combinations comprises two parameter combinations, and wherein a first of the two parameter combinations is indicated by the CSI reporting configuration, and wherein a second of the two parameter combinations is implied from the indicated first parameter combination.

7. The method of claim 1, wherein the CSI report corresponds to multiple transmission layers, wherein the selected subset of at least one parameter combination comprises one parameter combination assigned for each transmission layer.

8. The method of claim 1, wherein the selected subset of at least one parameter combination comprises one parameter combination assigned for each beam or assigned per polarization for each beam.

9. The method of claim 1, wherein the selected subset of at least one parameter combination comprises two parameter combinations, and wherein a first of the two parameter combinations is assigned to one or more transmission layers based on a first set of layer indices, and wherein a second of the two parameter combinations is assigned to one or more transmission layers based on a second set of layer indices.

10. The method of claim 1, wherein the selected subset of at least one parameter combination comprises two parameter combinations, and wherein a first of the two parameter combinations is assigned to one or more transmission layers based on a first set of rank indices, and wherein a second of the two parameter combinations is assigned to one or more transmission layers based on a second set of rank indices.

11. The method of claim 1, wherein the selected subset of at least one parameter combination comprises two parameter combinations, and wherein a first of the two parameter combinations is assigned to one or more beams based on a first set of beam indices, and wherein a second of the two parameter combinations are assigned to one or more beams based on a second set of beam indices.

12. The method of claim 1, wherein the selected subset of at least one parameter combination comprises a single parameter combination.

13. The method of claim 1, wherein an indication of the selected subset of at least one parameter combination is fed back in one part of the CSI report.

14. A User Equipment ("UE") apparatus comprising:
a transceiver that:
   receives a Channel State Information ("CSI") reporting configuration from a mobile communication network, the CSI reporting configuration comprising a codebook configuration; and
   receives a set of CSI reference signals; and
a processor that:
   identifies a set of antenna ports based on the set of CSI reference signals;
   selects a subset of at least one parameter combination from a set of two or more parameter combinations corresponding to the codebook configuration; and
   generates at least one coefficient amplitude indicator and one coefficient phase indicator for each antenna port in the identified set of antenna ports; and
   sends a CSI report to the mobile communication network, the CSI report indicating the selected parameter combination, the CSI report comprising a rank indicator that indicates a number of transmission layers and the generated at least one coefficient amplitude indicator and the coefficient phase indicator.

15. An apparatus in a mobile communication network, the apparatus comprising:
a processor; and
a transmitter that:
   transmits a Channel State Information ("CSI") reporting configuration to a User Equipment ("UE") in a mobile communication network, the CSI reporting configuration comprising a codebook configuration;
   transmits a set of CSI reference signals towards the UE; and
   receives a CSI report from the UE, the CSI report indicating a selected subset of at least one parameter combination from a set of two or more parameter combinations corresponding to the codebook configuration,
   wherein the CSI report comprises a rank indicator that indicates a number of transmission layers and at least one coefficient amplitude indicator and at least one coefficient phase indicator for each antenna port in a set of antenna ports identified by the UE.

* * * * *